(12) United States Patent
Nakata et al.

(10) Patent No.: US 7,074,344 B2
(45) Date of Patent: *Jul. 11, 2006

(54) LIQUID CRYSTAL ALIGNING AGENT AND LIQUID CRYSTAL DISPLAY ELEMENT

(75) Inventors: Shoichi Nakata, Tokyo (JP); Masayuki Kimura, Tokyo (JP)

(73) Assignee: JSR Corporation, Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 10/260,427

(22) Filed: Oct. 1, 2002

(65) Prior Publication Data

US 2003/0087045 A1 May 8, 2003

(30) Foreign Application Priority Data

| Oct. 3, 2001 | (JP) | ............................. 2001-307203 |
| Jan. 31, 2002 | (JP) | ............................. 2002-022855 |

(51) Int. Cl.
*C09K 19/56* (2006.01)
*C09K 19/52* (2006.01)

(52) U.S. Cl. ..................... 252/299.4; 428/1.1; 428/1.2; 428/1.25; 428/1.26; 428/1.27; 252/299.01

(58) Field of Classification Search ................ 428/1.1, 428/1.2, 1.25, 1.26, 1.27; 252/299.01, 299.4
See application file for complete search history.

(56) References Cited

U.S. PATENT DOCUMENTS

| 4,405,208 | A | * | 9/1983 | Shirai ........................ 349/132 |
| 5,501,884 | A | * | 3/1996 | Nakayama et al. ......... 428/1.26 |
| 5,540,997 | A | * | 7/1996 | Perettie et al. .............. 428/409 |
| 5,582,882 | A | * | 12/1996 | Kang et al. .................. 428/1.2 |
| 5,670,084 | A | * | 9/1997 | Harada et al. ......... 252/299.01 |
| 5,744,203 | A | * | 4/1998 | Harada et al. ............. 428/1.23 |
| 5,750,641 | A | * | 5/1998 | Ezzell et al. ................ 528/353 |
| 5,773,559 | A | * | 6/1998 | Miyamoto et al. .......... 528/353 |
| 5,783,656 | A | | 7/1998 | Kimura et al. |
| 6,143,380 | A | * | 11/2000 | Gibbons et al. ........... 428/1.27 |
| 6,194,039 | B1 | * | 2/2001 | Gibbons et al. ............. 428/1.1 |
| 6,218,501 | B1 | * | 4/2001 | Choi et al. ................... 528/170 |
| 6,224,788 | B1 | * | 5/2001 | Ogawa et al. ........... 252/299.4 |
| 6,242,061 | B1 | * | 6/2001 | Gibbons et al. ........... 428/1.27 |
| 6,312,769 | B1 | | 11/2001 | Hiraoka et al. |
| 6,346,947 | B1 | * | 2/2002 | Kang et al. .................. 345/532 |
| 6,495,221 | B1 | * | 12/2002 | Ogawa et al. ............. 428/1.23 |
| 6,524,715 | B1 | * | 2/2003 | Ootake et al. .............. 428/447 |
| 6,569,502 | B1 | * | 5/2003 | Ito et al. ...................... 428/1.1 |
| 6,887,534 | B1 | * | 5/2005 | Nakata et al. ............... 428/1.2 |
| 2001/0041231 | A1 | * | 11/2001 | Kagawa et al. ............. 428/1.1 |
| 2002/0034709 | A1 | * | 3/2002 | Fukuda et al. .............. 430/320 |

FOREIGN PATENT DOCUMENTS

| EP | 1 130 072 | * | 9/2001 |
| JP | 11-014830 | * | 1/1999 |
| JP | 2001-290155 | | 10/2001 |
| WO | 01/02510 | * | 1/2001 |

OTHER PUBLICATIONS

Choi, Dong Hoon; Cha, Young Kwan; "Photo-alignment of low-molecular mass nematic liquid crystals on photoreactive polyimide and polymetacylate film by irradiation of a linearly polarized UV light"; Polymer Bulletin 48, 373-380 (2002).*

English translation of Kunihiro et al.*

U.S. Appl. No. 10/367,893, filed Feb. 19, 2003, Nakata et al.*

* cited by examiner

*Primary Examiner*—Shean C Wu
(74) *Attorney, Agent, or Firm*—Oblon, Spivak, McClelland, Maier & Neustadt, P.C.

(57) ABSTRACT

The present invention provides a liquid crystal aligning agent which provides a liquid crystal alignment film having surface anchoring force and pretilt angle development stability by an optical aligning method. The liquid crystal aligning agent comprises a polymer having a photo-crosslinkable structure a structure having at least one group selected from the group consisting of a fluorine-containing organic group, an alkyl group having 10 to 30 carbon atoms and alicyclic organic group having 10 to 30 carbon atoms and optionally, (C) a thermally crosslinkable structure.

16 Claims, 1 Drawing Sheet

Pretilt angle on photo-alignment film as function of annealing time

LIQUID CRYSTAL ALIGNING AGENT AND LIQUID CRYSTAL DISPLAY ELEMENT

FIELD OF THE INVENTION

The present invention relates to a liquid crystal aligning agent, a method of forming a liquid crystal alignment film, and a liquid crystal display element. More specifically, it relates to a liquid crystal aligning agent which provides a liquid crystal alignment film having excellent aligning properties and pre-tilt angle developing stability through exposure to linearly polarized radiation without rubbing, a method of forming a liquid crystal alignment film from the liquid crystal aligning agent and a liquid crystal display element having this liquid crystal alignment film.

DESCRIPTION OF THE PRIOR ART

Heretofore, there have been known liquid crystal display elements having an TN (Twisted Nematic) or STN (Super Twisted Nematic) liquid crystal cell manufactured by sandwiching nematic liquid crystals having positive dielectric anisotropy between substrates having a transparent electrode and a liquid crystal alignment film to continuously twist the long axes of liquid crystal molecules at 90° or more between the substrates.

As means of aligning liquid crystals in a liquid crystal cell, there are a method in which an organic film is formed on the surface of a substrate and rubbed in one direction with cloth such as rayon cloth to provide liquid crystal aligning capability (rubbing), a method in which silicon oxide is deposited obliquely on the surface of a substrate, and a method in which a single molecular film having a long-chain alkyl group is formed by a Langmuir-Blodgett's technique (LB technique). However, the latter two methods have disadvantages that the size of the substrate is restricted and that the aligning uniformity of liquid crystals is unsatisfactory. Therefore, alignment of liquid crystals by rubbing which is industrially advantageous in terms of processing time and cost is commonly carried out.

Meanwhile, when liquid crystals are aligned by rubbing, dust is produced or static electricity is readily generated during this step. When static electricity is generated, dust is adhered to the surface of an alignment film, causing a display failure. In the case of a substrate having TFT (thin film transistor) elements, generated static electricity causes the circuit destruction of the TFT element, thereby reducing the yield. Further, liquid crystal display elements which will be improved to display a more and more fine image in the future have such a problem as rubbing nonuniformity due to the uneven surface of the substrate caused by an increase in the density of pixels.

Another means of aligning liquid crystals in the liquid crystal cell is to introduce anisotropy into an alignment film by exposing a photosensitive organic film of polyvinyl cinnamate or the like formed on the surface of a substrate to linearly polarized ultraviolet radiation so as to provide liquid crystal aligning capability. With this method, uniform alignment of liquid crystals can be realized without producing static electricity and dust.

The photosensitive organic film used in this photo-alignment method is made from polyimide which can be photo-decomposed, azobenzene derivative which can be photo-isomerized, or polyvinyl cinnamate or poly(4((2-methacryloxy)ethoxy)chalcone) which can be photo-crosslinked. Out of these, an organic thin film which can be photo-crosslinked is preferred as an alignment film from the viewpoints of thermal stability and electric properties.

However, in an alignment film obtained by this optical aligning method, sufficient surface anchoring force cannot be obtained, whereby an alignment failure such as flow alignment or disclination readily occurs when the film is used in a liquid crystal display element. As means of obtaining stable aligning properties, there is proposed a method in which liquid crystal surface anchoring is enhanced by heating a liquid crystal alignment film which has been aligned by exposure (JP-A 2001-290155) (the term "JP-A" as used herein means an "unexamined published Japanese patent application"). In general, when a liquid crystal alignment film is heated, its pretilt angle becomes unstable, thereby causing the deterioration of the display quality of an element such as the production of a pretilt domain, the formation of a disclination line, and in-plane nonuniformity in opto-electric properties.

Meanwhile, there is known homeotropic alignment that liquid crystal molecules having negative dielectric anisotropy are aligned perpendicularly to a substrate as one of the operation modes of a liquid crystal display element. In this operation mode, when voltage is applied between substrates, liquid crystal molecules are tilted toward a direction parallel to the substrates. As means of tilting the liquid crystal molecules toward one direction within the plane of the substrate from the normal direction of the substrate when voltage is applied, there is proposed a method in which liquid crystal molecules are slightly tilted from the normal direction of the substrate while no voltage is applied.

However, when the tilting direction of the liquid crystal molecules is controlled by this method, an alignment disturbance readily occurs by the influence of a horizontal electric field produced between pixels because anchoring force for the liquid crystal molecules is insufficient in a direction within the plane of the substrate. In this case, anchoring force for the liquid crystal molecules in the direction within the plane of the substrate can be improved by increasing the tilt angle from the normal direction of the substrate. However, when the tilt angle is 5° or more from the normal direction of the substrate, light transmission increases while no voltage is applied, resulting in reduced contrast.

SUMMARY OF THE INVENTION

It is an object of the present invention to provide a liquid crystal aligning agent which provides a liquid crystal alignment film having surface anchoring force and pretilt angle development stability by an optical aligning method.

It is another object of the present invention to provide a method of forming a liquid crystal alignment film from the above liquid crystal aligning agent of the present invention.

It is still another object of the present invention to provide a liquid crystal display element having excellent display characteristics and comprising the above liquid crystal alignment film of the present invention.

It is a further object of the present invention to provide a liquid crystal vertically aligning agent which provides a liquid crystal alignment film capable of applying surface anchoring force in a direction within the plane of a substrate to liquid crystal molecules when voltage is applied although a tilt angle from the normal direction of the substrate is not developed.

Other objects and advantages of the present invention will become apparent from the following description.

According to the present invention, firstly, the above objects and advantages of the present invention are attained by a liquid crystal aligning agent (also called "liquid crystal aligning agent (1)" hereinafter) comprising a polymer having:

(A) a photo-crosslinkable structure (also called "structure (A)" hereinafter), and (B) a structure having at least one group selected from the group consisting of a fluorine-containing organic group, an alkyl group having 10 to 30 carbon atoms and alicyclic organic group having 10 to 30 carbon atoms (also called "structure (B)" hereinafter).

According to the present invention, secondly, the above objects and advantages of the present invention are attained by a liquid crystal aligning agent (also called "liquid crystal aligning agent (2)" hereinafter) comprising a polymer having the above structure (A), the above structure (B) and (C) a thermally crosslinkable structure (also called "structure (C)" hereinafter), or a mixture of polymers, each having at least one structure selected from the group consisting of the above structures (A), (B) and (C), the mixture having all the above structures (A), (B) and (C).

According to the present invention, thirdly, the above objects and advantages of the present invention are attained by a liquid crystal aligning agent (also called "liquid crystal aligning agent (3)" hereinafter) comprising a polymer having the above structures (A) and (B), or a mixture of polymers, each having at least one structure selected from the group consisting of the above structures (A) and (B), the mixture having both of the structures (A) and (B), and (C') a compound having a thermally crosslinkable structure (also called "compound (C')" hereinafter).

The liquid crystal aligning agents (1), (2) and (3) will also generally be referred to as "liquid crystal aligning agent of the present invention" hereinafter.

In the fourth place, the above objects and advantages of the present invention are attained by a method of forming a liquid crystal alignment film, comprising exposing a film obtained from the liquid crystal aligning agent of the present invention to polarized ultraviolet radiation under heating above the room temperature.

In the fifth place, the above objects and advantages of the present invention are attained by a liquid crystal display element having a liquid crystal alignment film obtained from the liquid crystal aligning agent of the present invention.

DETAILED DESCRIPTION OF THE PREFERRED EMBODIMENT

Figure 1:
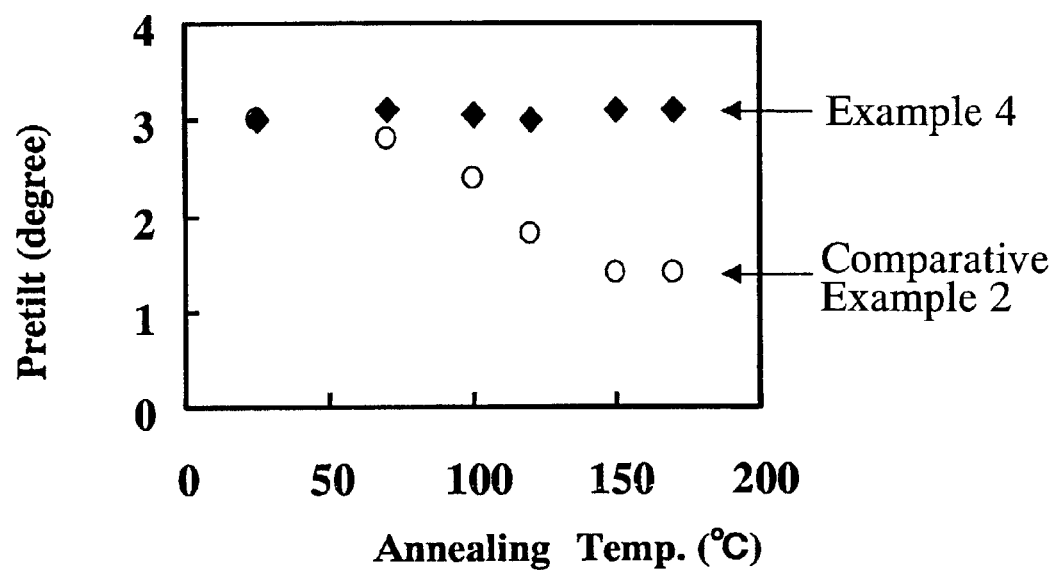
FIG. 1 is a graph showing the evaluation results of pretilt angle developing stability of Example 4 and Comparative Example 2.

The present invention will be described in detail hereinunder.

Liquid Crystal Aligning Agent (1)

The liquid crystal aligning agent (1) comprises a polymer having the structure (A) and the structure (B) and not the following structure (C) (also called "specific polymer" hereinafter).

The skeleton of the specific polymer is not particularly limited. Illustrative examples of the skeleton include polyamic acid, polyimide, polymaleimide, polystyrene, maleimide/styrene copolymer, polyester, polyamide, poly (meth)acrylate, polysiloxane and copolymers thereof. Polyimide, polyamic acid, polystyrene and maleimide/styrene copolymer are particularly preferred because they have excellent heat resistance and electric properties.

As for the contents of the structure (A) and the structure (B) in the specific polymer, the amount of the recurring unit having the structure (A) is preferably 10 to 95%, more preferably 50 to 90% and the amount of the recurring unit having the structure (B) is preferably 5 to 50%, more preferably 10 to 25% based on the total amount of all the recurring units.

Each component of the liquid crystal aligning agent (1) will be described hereinafter.

Liquid Crystal Aligning Agent (2)

The liquid crystal aligning agent (2) comprises a polymer having the structures (A), (B) and (C) or a polymer mixture. The polymer is a copolymer having the structures (A), (B) and (C). The polymer mixture is a mixture of polymers, each having at least one structure selected from the group consisting of the structures (A), (B) and (C) and has the structures (A), (B) and (C) as a whole.

The following components 1 to 3 are preferred as a polymer component.

1. a mixture of the above specific polymer and a polymer having the structure (C)
2. a copolymer having the structures (A), (B) and (C)
3. a mixture of a polymer having the structure (A), a polymer having the structure (B) and not the structure (A), and a polymer having the structure (C) and not the structures (A) and (B)

The skeleton of the polymer used in the present invention is not particularly limited. Examples of the polymers having structure (A) and structure (B), and the specific polymer (to be generally referred to as "polymer I" hereinafter), include polyamic acid, polyimide, polymaleimide, polystyrene, maleimide/styrene copolymer, polyester, polyamide, poly (meth)acrylate, polysiloxane and copolymers thereof. Polyimide, polyamic acid, polystyrene and maleimide/styrene copolymer are particularly preferred because they have excellent heat resistance and electric properties. Preferred examples of the polymer having structure (C) include epoxy resin and (meth)acrylate polymers having an epoxy structure in the side chain. Preferred examples of the copolymer having the structures (A), (B) and (C) include polystyrene and maleimide/styrene copolymer.

As for the contents of the structures (A) to (C) in the whole polymer components, the amount of the recurring unit having the structure (A) is preferably 10 to 95%, more preferably 50 to 90%, the amount of the recurring unit having the structure (B) is preferably 5 to 50%, more preferably 10 to 25%, and the amount of the recurring unit having the structure (C) is preferably 0.1 to 5%, more preferably 1 to 4% based on the total amount of all the recurring units contained in the polymer component.

Each component of the liquid crystal aligning agent (2) will be described hereinafter.

Liquid Crystal Aligning Agent (3)

The liquid crystal aligning agent (3) comprises a polymer having the structures (A) and (B) or a polymer mixture and a compound (C'). The polymer is the specific polymer, and the polymer mixture is a mixture of a polymer having the structure (A) and a polymer having the structure (B) and not the structure (A).

The skeleton of the polymer is not particularly limited but preferably the structure of the above polymer I. Preferably, polyimide and/or polyamic acid are/is used as a polymer component and a compound having an epoxy structure is used as the compound (C').

As for the contents of the structures (A) and (B) in the polymer or the polymer mixture, the amount of the recurring unit having the structure (A) is preferably 10 to 95%, more preferably 50 to 90%, and the amount of the recurring unit having the structure (B) is preferably 5 to 50%, more preferably 10 to 25% based on the total amount of all the recurring units in the polymer or the polymer mixture.

The amount of the compound (C') is preferably 0.1 to 30 parts by weight, more preferably 1 to 10 parts by weight based on 100 parts by weight of the polymer or the polymer mixture.

Each component of the liquid crystal aligning agent (3) will be described hereinafter.

Structure (A)

The structure (A) is not particularly limited if it is an optically crosslinkable structure. It is preferably at least one conjugated enone structure selected from the group consisting of structures represented by the following formulas (I), (II), (III) and (IV).

     (I)

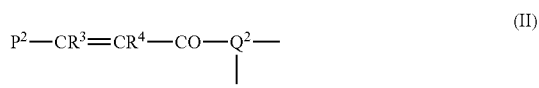     (II)

     (III)

     (IV)

In the above formulas, $P^1$, $P^2$, $P^3$, $P^4$, $Q^1$, $Q^2$, $Q^3$ and $Q^4$ are each an organic group having an aromatic ring. That is, $P^1$, $P^4$, $Q^1$ and $Q^3$ are each an divalent organic group having an aromatic ring, $P^2$, $P^3$ and $Q^4$ are each a monovalent organic group having an aromatic ring, and $Q^2$ is a trivalent organic group having an aromatic ring. $R^1$, $R^2$, $R^3$, $R^4$, $R^5$, $R^6$, $R^7$ and $R^8$ are each a hydrogen atom or alkyl group.

The organic group having an aromatic group represented by $P^1$, $P^2$, $P^3$, $P^4$, $Q^1$, $Q^2$, $Q^3$ and $Q^4$ is preferably an organic group having 6 to 20 carbon atoms.

The organic group may contain a halogen atom. Examples of the organic group represented by $P^2$, $P^3$ and $Q^4$ include 4-pentylphenyl group, 4-fluorophenyl group, 3,4-difluorophenyl group, 3,4,5-trifluorophenyl group, 4-octylphenyl group, 4-pentylbiphenyl group, 4-octylbiphenyl group, 4-fluorobiphenyl group, 3,4-difluorobiphenyl group, 3,4,5-trifluorobiphenyl group, 4-octyl-1-naphthyl group, 5-pentyl-1-naphthyl group, 6-octyl-2-naphthyl group, 9-anthryl group and 10-pentyl-9-anthryl group.

Examples of the organic group represented by $P^1$, $P^4$, $Q^1$ and $Q^3$ include 1,2-phenylene group, 1,3-phenylene group, 1,4-phenylene group and 4,4'-biphenylene group.

Examples of the organic group represented by $Q^2$ include trivalent skeletons such as benzene skeleton, biphenyl skeleton, naphthalene skeleton and anthracene skeleton.

These groups may be the same or different.

In the above formulas, $R^1$, $R^2$, $R^3$, $R^4$, $R^5$, $R^6$, $R^7$ and $R^8$ are each a hydrogen atom or alkyl group, preferably a hydrogen atom or alkyl group having 1 to 6 carbon atoms. These alkyl groups may be linear or branched and the same or different.

Other examples of the structure (A) include stilbene derivative structures, benzophenone derivative structures and cinnamoyl structures. These structures may be linear or part of a cyclic structure like a coumarin structure. These structures (A) may be used alone or in combination in the polymer component.

Structure (B)

The structure (B) is at least one selected from the group consisting of fluorine-containing organic group, alkyl group having 10 to 30 carbon atoms and alicyclic organic group having 10 to 30 carbon atoms. It has the function of providing a pretilt angle to a liquid crystal alignment film obtained from the liquid crystal aligning agent of the present invention.

Examples of the fluorine-containing organic group include trifluoromethyl group, pentafluoroethyl group, 4-fluorocyclohexyl group, pentafluorocyclohexyl group, 4-fluorophenyl group and pentafluorophenyl group. Examples of the alkyl group having 10 to 30 carbon atoms include n-decyl group, n-dodecyl group, n-tetradecyl group, n-pentadecyl group, n-hexadecyl group, n-octadecyl group and n-eicosyl group. Examples of the alicyclic organic group having 10 to 30 carbon atoms include cholesteryl group and cholestanyl group. The above fluorine-containing organic group and alkyl group may be bonded by a bond group such as —O—, —CO—, —COO—, —OCO—, —NHCO—, —CONH— or —S— in the structure (B).

Structure (C)

The structure (C) is not particularly limited if it is a thermally crosslinkable structure. It is preferably an epoxy group.

Polymer I

The above polyamic acid and polyimide which are examples of the polymer I are obtained by reacting (a) a tetracarboxylic dianhydride with (b) a diamine compound to produce a polyamic acid and by dehydrating and closing the ring of the polyamic acid to produce a polyimide, respectively. In the production of the polyamic acid and polyimide, a compound having the structure (A) and/or a compound having the structure (B) are/is used as at least one of the above components (a) and (b).

Examples of the tetracarboxylic dianhydride having the structure (A) include 2,2'-bis(4-chalconyloxy)-3,3',4,4'-biphenyltetracarboxylic dianhydride, 3,3'-bis(4-chalconyloxy)-4,4',5,5'-biphenyltetracarboxylic dianhydride, 2,2'-bis(4-chalconyloxy)-4,4',5,5'-biphenyltetracarboxylic dianhydride, 4,4'-bis(4-chalconyloxy)-2,2',3,3'-biphenyltetracarboxylic dianhydride, 6,6'-bis(4-chalconyloxy)-2,2',3,3'-biphenyltetracarboxylic dianhydride, 5,5'-bis(4-chalconyloxy)-2,2',3,3'-biphenyltetracarboxylic dianhydride, 2,2'-bis(4-chalconyloxy)-3,3',4,4'-diphenylether tetracarboxylic dianhydride, 3,3'-bis(4-chalconyloxy)-4,4',5,5'-diphenylether tetracarboxylic dianhydride, 2,2'-bis(4-chalconyloxy)-4,4',5,5'-diphenylether tetracarboxylic dianhydride, 4,4'-bis(4-chalconyloxy)-2,2',3,3'-diphenylether tetracarboxylic dianhydride, 6,6'-bis(4-chalconyloxy)-2,2',3,3'-diphenylether tetracarboxylic dianhydride, 5,5'-bis(4-chalconyloxy)-2,2',3,3'-diphenylether tetracarboxylic dianhydride, 2,2'-bis(6(4-chalconyloxy)hexyloxy)-3,3',4,4'-biphenyltetracarboxylic dianhydride, 2,2'-bis(6(4'-fluoro-4-chalconyloxy)hexyloxy)-3,3',4,4'-biphenyltetracarboxylic dianhydride, 3,3'-bis(6(4-chalconyloxy)hexyloxy)-4,4',5,5'-biphenyltetracarboxylic dianhydride, 3,3'-bis(6(4'-fluoro-4-chalconyloxy)hexyloxy)-4,4',5,5'-biphenyltetracarboxylic dianhydride, 2,2'-bis(6(4-chalconyloxy)hexyloxy)-4,4',5,5'-biphenyltetracarboxylic dianhydride, 2,2'-bis(6(4'-fluoro-4-chalconyloxy)hexyloxy)-4,4',5,5'-biphenyltetracarboxylic dianhydride, 4,4'-bis(6(4-chalconyloxy)hexyloxy)-2,2',3,3'-biphenyltetracarboxylic dianhydride, 4,4'-bis(6(4'-fluoro-4-chalconyloxy)hexyloxy)-2,2',3,3'-biphenyltetracarboxylic dianhydride, 6,6'-bis(6(4-chalconyloxy)hexyloxy)-2,2',3,3'-biphenyltetracarboxylic dianhydride, 6,6'-bis(6(4'-fluoro-4-chalconyloxy)hexyloxy)-2,2',3,3'-biphenyltetracarboxylic dianhydride, 5,5'-bis(6(4-chalconyloxy)hexyloxy)-2,2',3,3'-biphenyltetracarboxylic dianhydride, 5,5'-bis(6(4'-fluoro-4-chalconyloxy)hexyloxy)-2,2',3,3'-biphenyltetracarboxylic dianhydride, 2,2'-bis(6(4-chalconyloxy)hexyloxy)-3,3',4,4'-diphenylether tetracarboxylic dianhydride, 2,2'-bis(6(4'-fluoro-4-chalconyloxy)hexyloxy)-3,3',4,4'-diphenylether tetracarboxylic dianhydride, 3,3'-bis(6(4-chalconyloxy)

hexyloxy)-4,4',5,5'-diphenylether tetracarboxylic dianhydride, 3,3'-bis(6(4'-fluoro-4-chalconyloxy)hexyloxy)-4,4',5,5'-diphenylether tetracarboxylic dianhydride, 2,2'-bis(6(4-chalconyloxy)hexyloxy)-4,4',5,5'-diphenylether tetracarboxylic dianhydride, 2,2'-bis(6(4'-fluoro-4-chalconyloxy)hexyloxy)-4,4',5,5'-diphenylether tetracarboxylic dianhydride, 4,4'-bis(6(4-chalconyloxy)hexyloxy)-2,2',3,3'-diphenylether tetracarboxylic dianhydride, 4,4'-bis(6(4'-fluoro-4-chalconyloxy)hexyloxy)-2,2',3,3'-diphenylether tetracarboxylic dianhydride, 6,6'-bis(6(4-chalconyloxy)hexyloxy)-2,2',3,3'-diphenylether tetracarboxylic dianhydride, 6,6'-bis(6(4'-fluoro-4-chalconyloxy)hexyloxy)-2,2',3,3'-diphenylether tetracarboxylic dianhydride, 5,5'-bis(6(4-chalconyloxy)hexyloxy)-2,2',3,3'-diphenylether tetracarboxylic dianhydride, 5,5'-bis(6(4'-fluoro-4-chalconyloxy)hexyloxy)-2,2',3,3'-diphenylether tetracarboxylic dianhydride, 2,2'-bis(6(4-chalconyloxy)hexyloxy)-3,3',4,4'-benzophenonetetracarboxylic dianhydride, 2,2'-bis(6(4'-fluoro-4-chalconyloxy)hexyloxy)-3,3',4,4'-benzophenonetetracarboxylic dianhydride, 3,3'-bis(6(4-chalconyloxy)hexyloxy)-4,4',5,5'-benzophenonetetracarboxylic dianhydride, 3,3'-bis(6(4'-fluoro-4-chalconyloxy)hexyloxy)-4,4',5,5'-benzophenonetetracarboxylic dianhydride, 2,2'-bis(6(4-chalconyloxy)hexyloxy)-4,4',5,5'-benzophenonetetracarboxylic dianhydride, 2,2'-bis(6(4'-fluoro-4-chalconyloxy)hexyloxy)-4,4',5,5'-benzophenonetetracarboxylic dianhydride, 4,4'-bis(6(4-chalconyloxy)hexyloxy)-2,2',3,3'-benzophenonetetracarboxylic dianhydride, 4,4'-bis(6(4'-fluoro-4-chalconyloxy)hexyloxy)-2,2',3,3'-benzophenonetetracarboxylic dianhydride, 6,6'-bis(6(4-chalconyloxy)hexyloxy)-2,2',3,3'-benzophenonetetracarboxylic dianhydride, 6,6'-bis(6(4'-fluoro-4-chalconyloxy)hexyloxy)-2,2',3,3'-benzophenonetetracarboxylic dianhydride, 5,5'-bis(6(4-chalconyloxy)hexyloxy)-2,2',3,3'-benzophenonetetracarboxylic dianhydride, 5,5'-bis(6(4'-fluoro-4-chalconyloxy)hexyloxy)-2,2',3,3'-benzophenonetetracarboxylic dianhydride, 3(6(4-chalconyloxy)hexyloxy)-pyromellitic dianhydride, 3(6(4'-fluoro-4-chalconyloxy)hexyloxy)-pyromellitic dianhydride, 3,6-bis(6(4-chalconyloxy)hexyloxy)-pyromellitic dianhydride, 3,6-bis(6(4'-fluoro-4-chalconyloxy)hexyloxy)-pyromellitic dianhydride, compounds represented by the following formulas (1) to (22):

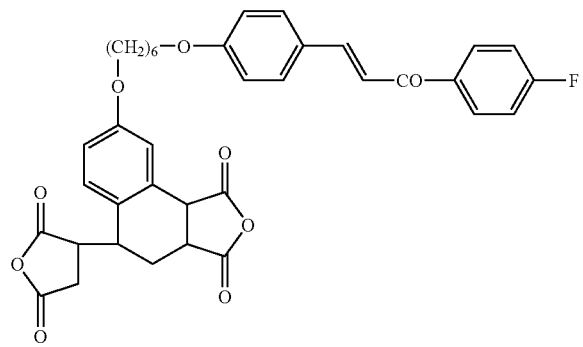

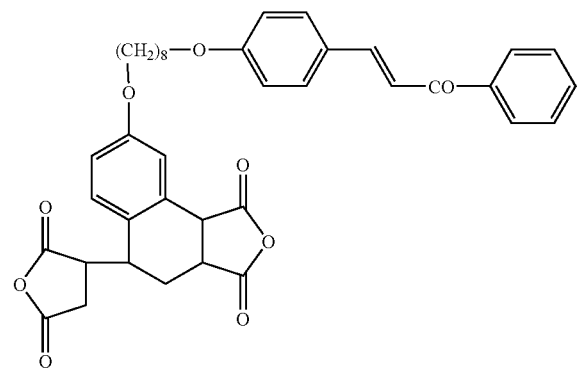

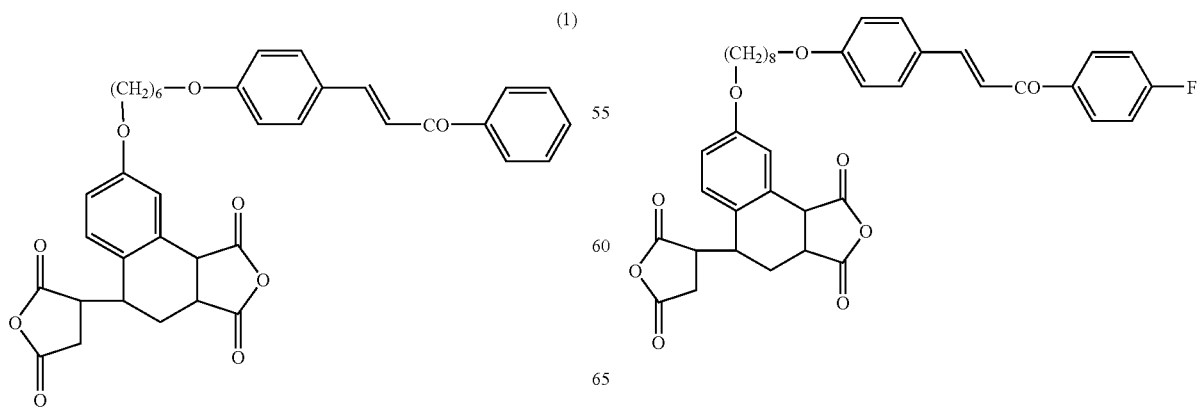

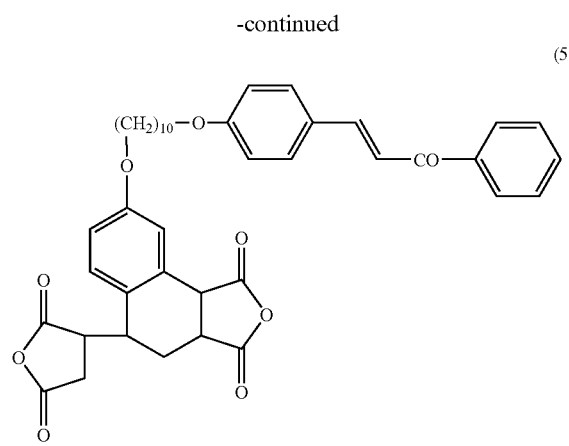
(5)
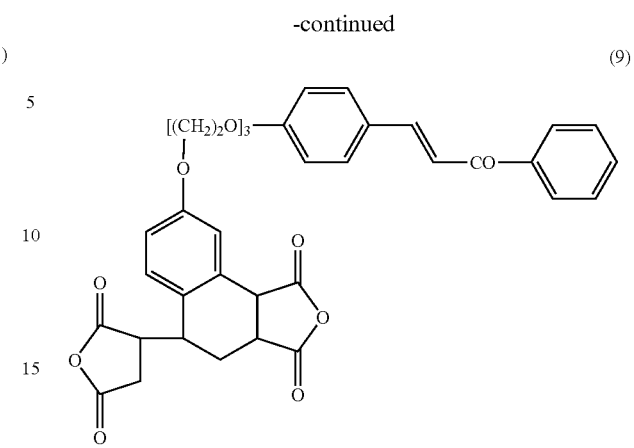
(9)
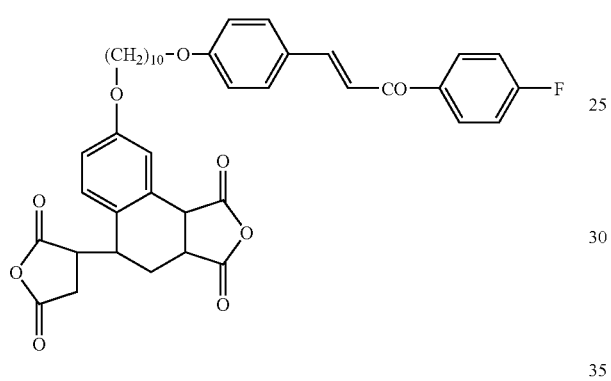
(6)
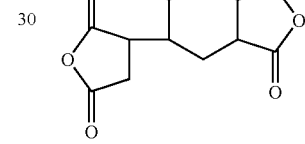
(10)
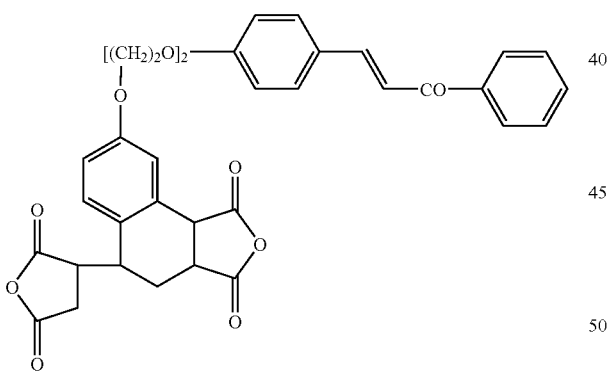
(7)
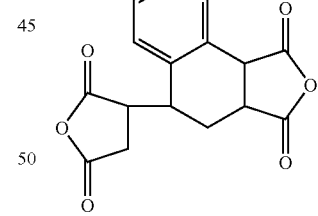
(11)
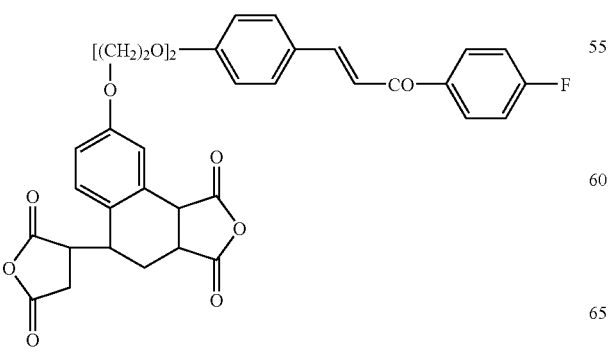
(8)
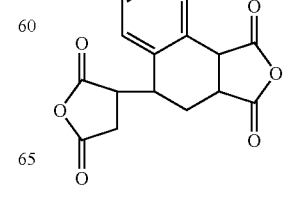
(12)

-continued
(13)
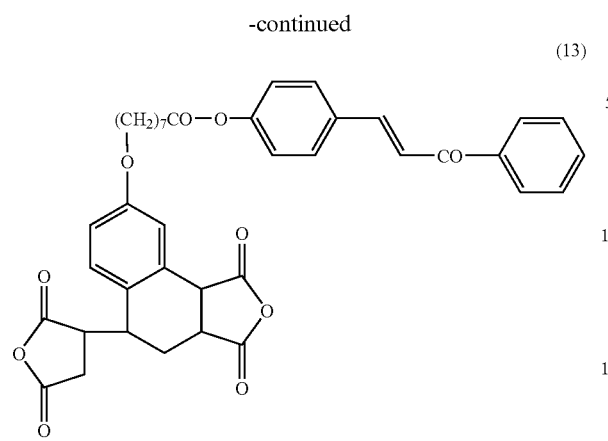
(14)
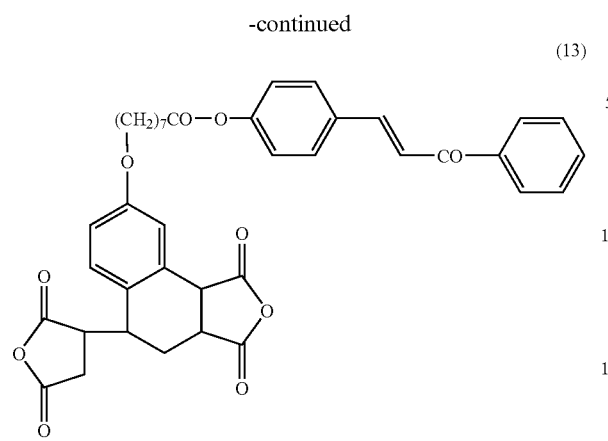
(15)
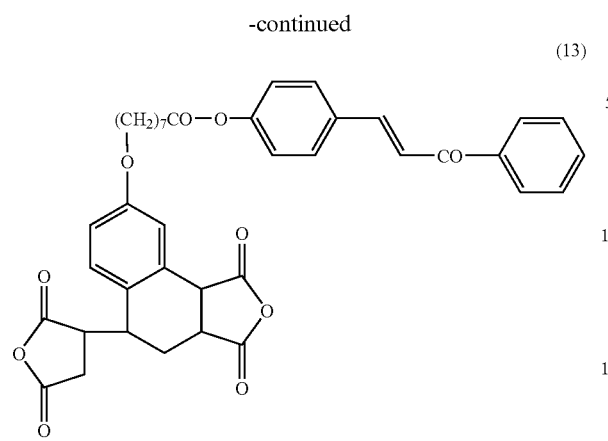
(16)
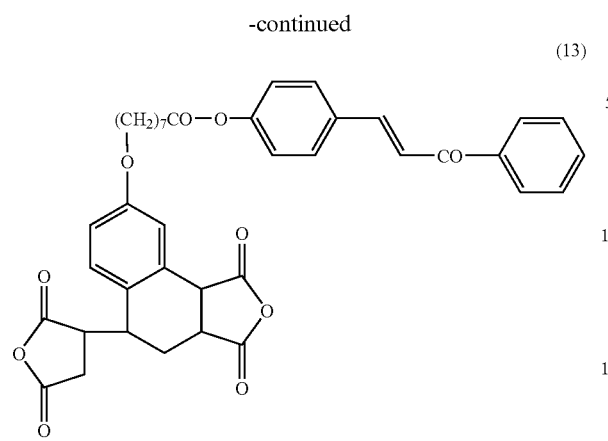
-continued
(17)
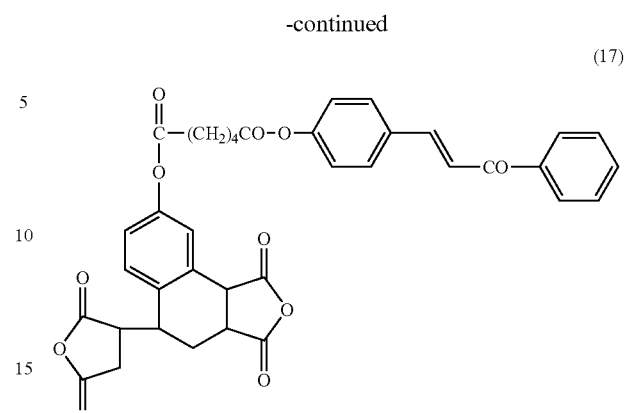
(18)
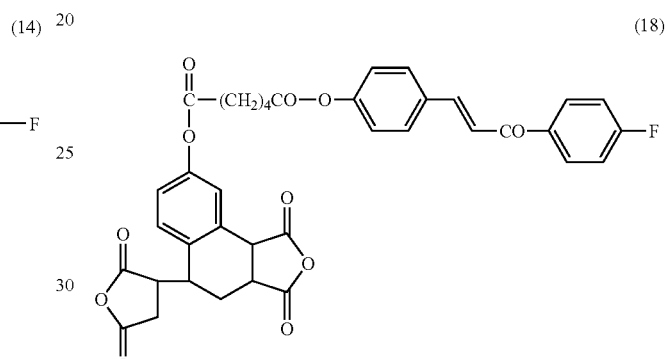
(19)
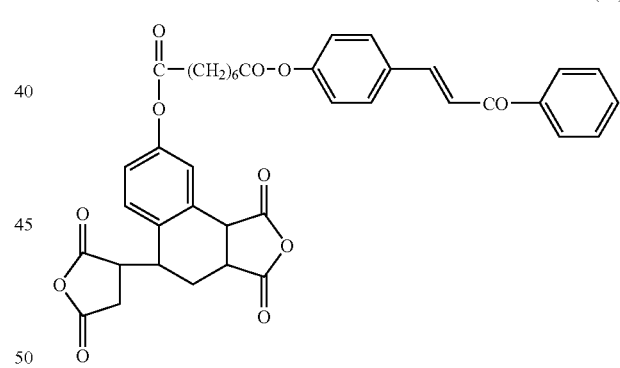
(20)
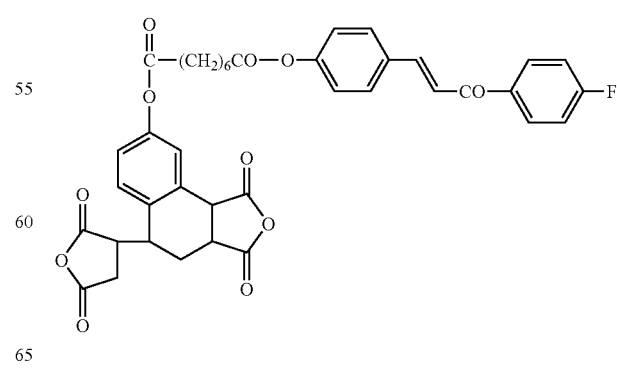

-continued

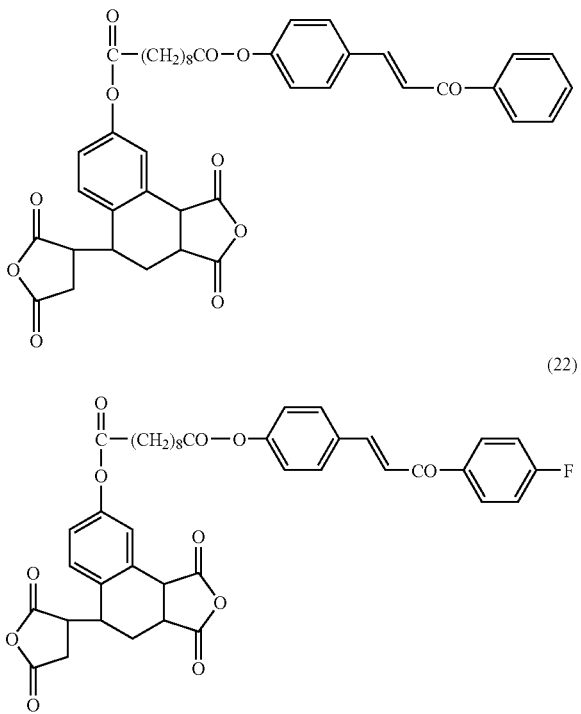

(21)

(22)

2,2'-bis(4(4-chalconyl)phenoxy)-3,3',4,4'-biphenyltetracarboxylic dianhydride, 3,3'-bis(4(4-chalconyl)phenoxy)-4,4', 5,5'-biphenyltetracarboxylic dianhydride, 2,2'-bis(4(4-chalconyl)phenoxy)-4,4',5,5'-biphenyltetracarboxylic dianhydride, 4,4'-bis(4(4-chalconyl)phenoxy)-2,2'3,3'-biphenyltetracarboxylic dianhydride, 6,6'-bis(4(4-chalconyl)phenoxy)-2,2',3,3'-biphenyltetracarboxylic dianhydride, 5,5'-bis(4(4-chalconyl)phenoxy)-2,2',3,3'-biphenyltetracarboxylic dianhydride, 2,2'-bis(4(4-chalconyl)phenoxy)-3,3', 4,4'-diphenylether tetracarboxylic dianhydride, 3,3'-bis(4(4-chalconyl)phenoxy)-4,4',5,5'-diphenylether tetracarboxylic dianhydride, 2,2'-bis(4(4-chalconyl)phenoxy)-4,4',5,5'-diphenylether tetracarboxylic dianhydride, 4,4'-bis(4(4-chalconyl)phenoxy)-2,2',3,3'-diphenylether tetracarboxylic dianhydride, 6,6'-bis(4(4-chalconyl)phenoxy)-2,2',3,3'-diphenylether tetracarboxylic dianhydride and 5,5'-bis(4(4-chalconyl)phenoxy)-2,2',3,3'-diphenylether tetracarboxylic dianhydride. They may be used alone or in combination of two or more.

Examples of the diamine compound having the structure (A) include 4(3,5-diaminophenoxy)-4'-isopropylchalcone, 4(3,5-diaminophenoxy)-4'-pentylchalcone, 4(3,5-diaminophenoxy)-4'-octylchalcone, 4(2,4-diaminophenoxy)-4'-pentylchalcone, 4(2,4-diaminophenoxy)-4'-octylchalcone, 4(3,5-diaminobenzoyloxy)-4'-pentylchalcone, 4'(4-pentylphenyl)-4(3,5-diaminophenoxy)chalcone, 6(4-chalconyloxy)hexyloxy(2,4-diaminobenzene), 6(4'-fluoro-4-chalconyloxy)hexyloxy(2,4-diaminobenzene), 8(4-chalconyloxy)octyloxy(2,4-diamnobenzene), 8(4'-fluoro-4-chalconyloxy)octyloxy(2,4-diaminobenzene), 10(4-chalconyloxy)decyloxy(2,4-diaminobenzene), 10(4'-fluoro-4-chalconyloxy)decyloxy(2,4-diaminobenzene), 2(2(4-chalconyloxy)ethoxy)ethyl(3,5-diaminobenzoate), 2(2(4'-fluoro-4-chalconylxoy)ethoxy)ethyl(3,5-diaminobenzoate), 2(2(4-chalconyloxy)ethoxy)ethoxy(2,4-diaminobenzene), 2(2(4'-fluoro-4-chalconyloxy)ethoxy)ethoxy(2,4-diaminobenzene), 1((4-chalconyloxy)ethoxy)-2((2,4-diaminophenoxy)ethoxy) ethane, 1((4'-fluoro-4-chalconyloxy)ethoxy)-2((2,4-diaminophenoxy)ethoxy)ethane, 1-((4-chalconyloxy)ethoxy)-2-((3,5-diaminobenzoyloxy) ethoxy)ethane, 1-((4'-fluoro-4-chalconyloxy)ethoxy)-2-((3,5-diaminobenzoyloxy)ethoxy)ethane, 6(4-chalconyloxy)hexyloxy(3,5-diaminobenzoyl), 6(4'-fluoro-4-chalconyloxy)hexyloxy(3,5-diaminobenzoyl), 8(4-chalconyloxy)octyloxy(3,5-diaminobenzoyl), 8(4'-fluoro-4-chalconyloxy)octyloxy(3,5-diaminobenzoyl), 10(4-chalconyloxy)decyloxy(3,5-diaminobenzoyl), 10(4'-fluoro-4-chalconyloxy)decyloxy(3,5-diaminobenzoyl), 6(4-chalconyloxy)hexanoic acid (2,4-diaminophenyl), 6(4'-fluoro-4-chalconyloxy)hexanoic acid (2,4-diaminophenyl), 8(4-chalconyloxy)-octanoic acid-(2,4-diaminophenyl), 8(4'-fluoro-4-chalconyloxy)-octanoic acid-(2,4-diaminophenyl), 10(4-chalconyloxy)-decanoic acid-(2,4-diaminophenyl), 10(4'-fluoro-4-chalconyloxy)-decanoic acid-(2,4-diaminophenyl), mono(4-chalconyl)mono(2,4-diaminophenyl) adipate, mono(4'-fluoro-4-chalconyl)mono(2,4-diaminophenyl) adipate, mono(4-chalconyl)mono(2,4-diaminophenyl)suberate, mono(4'-fluoro-4-chalconyloxy) mono(2,4-diamnophenyl) suberate, mono(4-chalconyl)mono(2,4-diaminophenyl)sebacate, mono(4'-fluoro-4-chalconyl)mono(2,4-diaminophenyl) sebacate, bis-1,1(4-aminophenyl)-6(4-chalconyloxy)hexane, bis-1,1(4-aminophenyl)-6(4'-fluoro-4-chalconyloxy)hexane, bis-1,1(4-aminophenyl)-8(4-chalconyloxy)octane, bis-1,1(4-aminophenyl)-8(4'-fluoro-4-chalconyloxy)octane, bis-1,1(4-aminophenyl)-10(4-chalconyloxy)decane, bis-1,1(4-aminophenyl)-10(4'-fluoro-4-chalconyloxy) decane, bis-N,N-(4-aminophenyl)-N-(6(4-chalconyloxy)hexanoxyphenyl)amine, bis-N,N-(4-aminophenyl)-N-(6(4'-fluoro-4-chalconyloxy) hexanoxyphenyl)amine, bis-N,N-(4-aminophenyl)-N-(8(4-chalconyloxy) octanoxyphenyl) amine, bis-N,N-(4-aminophenyl)-N-(8(4'-fluoro-4-chalconyloxy) octanoxyphenyl)amine, bis-N,N-(4-aminophenyl)-N-(10(4-chalconyloxy) decanoxyphenyl) amine, bis-N,N-(4-aminophenyl)-N-(10(4'-fluoro-4-chalconyloxy) decanoxyphenyl)amine, bis-N,N-(4-aminophenyl)-N-(2(2(4-chalconyloxy)ethoxy) ethoxyphenyl)amine, bis-N,N-(4-aminophenyl)-N-(4(2(2 (4'-fluoro-4-chalconyloxy)ethoxy)ethoxy)phenyl)amine, 4(2,4-diaminophenoxy)phenyl)chalcone, 4(4(2(2,4-diaminophenoxy)ethoxy)phenyl)chalcone, 4(4(6(2,4-diaminophenoxy)hexanoxy)phenyl)chalcone, 4(2(2,4-diaminophenoxy)ethyl)chalcone carboxylate, 4(6(2,4-diaminophenoxy)hexyl)chalcone carboxylate, 4(4(2,4-diaminophenoxy)bezoyloxy)chalcone, 4(4(2,4-diaminophenoxy)phenyl)chalcone carboxylate, 4(4(2(2,4-diaminophenoxy)ethoxy)benzoyloxy)chalcone, 4(4(2(2,4-diaminophenoxy)ethoxy)phenyl)chalcone carboxylate, 4(4 (6(2,4-diaminophenoxy)hexanoxy)benzoyloxy)chalcone, 4(4(6(2,4-diaminophenoxy)hexanoxy)phenyl)chalcone carboxylate, 4(4(3,5-diaminobenzoyloxy)phenyl)chalcone, 4(4 (2(3,5-diaminobenzoyloxy)ethoxy)phenyl)chalcone, 4(4(6 (3,5-diaminobenzoyloxy)hexanoxy)phenyl)chalcone, 4(2(3, 5-diaminobenzoyloxy)ethyl)chalcone carboxylate, 4(6(3,5-diaminobenzoyloxy)hexyl)chalcone carboxylate, 4(4(3,5-diaminobenzoyloxy)benzoyloxy)chalcone, 4(4(3,5-diaminobenzoyloxy)phenyl)chalcone carboxylate, 4(4(2(3, 5-diaminobenzoyloxy)ethoxy)benzoyloxy)chalcone, 4(4(2 (3,5-diaminobenzoyloxy)ethoxy)phenyl)chalcone carboxylate, 4(4(6(3,5-diaminobenzoyloxy)hexanoxy)benzoyloxy)chalcone and 4(4(6(3,5-diaminobenzoyloxy)hexanoxy)phenyl)chalcone carboxylate. They may be used alone or in combination of two or more.

Examples of the tetracarboxylic dianhydride having the structure (B) include compounds represented by the following chemical formulas (23) to (36). They may be used alone or in combination of two or more.
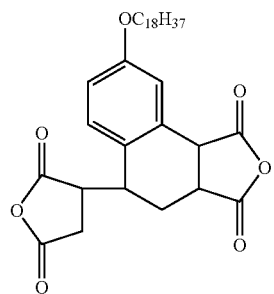
(23)
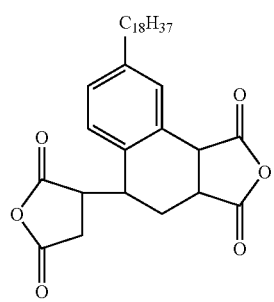
(24)
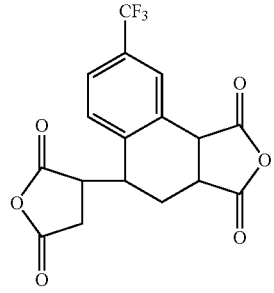
(25)
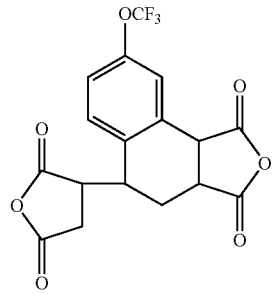
(26)
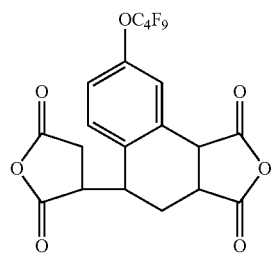
(27)
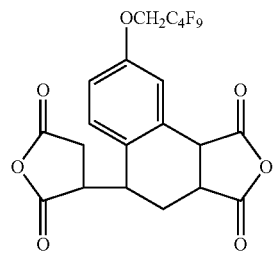
(28)
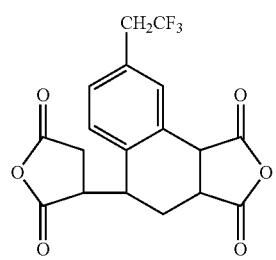
(29)
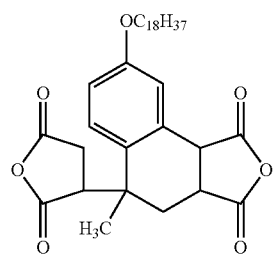
(30)
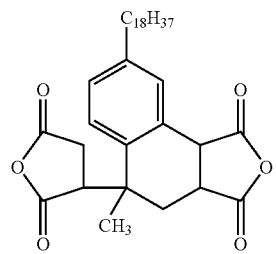
(31)
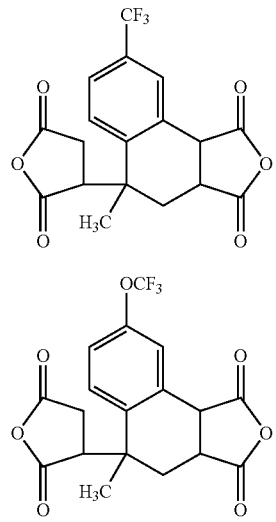
(32)
(33)

-continued

(34)
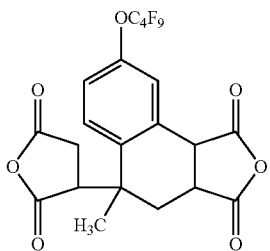

(35)
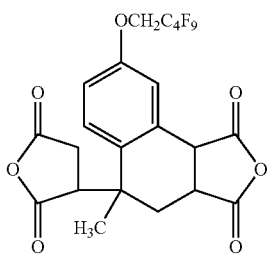

(36)
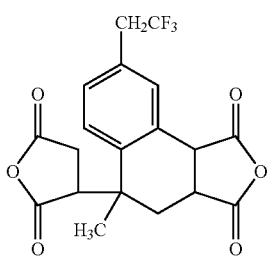

Examples of the diamine compound having the structure (B) include 1-dodecanoxy-2,4-diaminobenzene, 1-tetradecanoxy-2,4-diaminobenzene, 1-pentadecanoxy-2,4-diaminobenzene, 1-hexadecanoxy-2,4-diaminobenzene, 1-octadecanoxy-2,4-diaminobenzene, 1-cholesteryloxy-2,4-diaminobenzene, 1-cholestanyloxy-2,4-diaminobenzene, dodecanoxy(3,5-diaminobenzoyl), tetradecanoxy(3,5-diaminobenzoyl), pentadecanoxy(3,5-diaminobenzoyl), hexadecanoxy(3,5-diaminobenzoyl), octadecanoxy(3,5-diaminobenzoyl), cholesteryloxy(3,5-diaminobenzoyl), cholestanyloxy(3,5-diaminobenzoyl), (2,4-diaminophenoxy)palmitate, (2,4-diaminophenoxy)stearate, (2,4-diaminophenoxy)-4-trifluoromethyl benzoate and compound represented by the following formula (37).

(37)
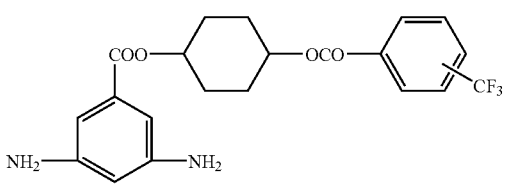

The polyimide used in the present invention may be used in conjunction with another tetracarboxylic dianhydride and/or diamine compound in limits which do not impair the effect of the present invention. The component(s) are used in an amount of preferably 60 or less mol %, more preferably 20 or less mol % based on the total of the compound having the above structure (A) and the compound having the structure (B).

Illustrative examples of the another tetracarboxylic dianhydride include aliphatic and alicyclic tetracarboxylic dianhydrides such as 2,3,5-tricarboxycyclopentylacetic dianhydride, butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 5-(2,5-dioxotetrahydrofural)-3-methyl-3-cyclohexene-1,2-dicarboxylic dianhydride and bicyclo[2.2.2]-oct-7-ene-2,3,5,6-tetracarboxylic dianhydride; and aromatic tetracarboxylic dianhydrides such as pyromellitic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenetetracarboxylic dianhydride, 3,3',4,4'-biphenyltetracarboxylic dianhydride, bis(phthalic acid)phenylphosphine oxide dianhydride, p-phenylene-bis(triphenylphthalic)dianhydride, m-phenylene-bis(triphenylphthalic)dianhydride, bis(triphenylphthalic acid)-4,4'-diphenylether dianhydride and bis(triphenylphthalic acid)-4,4'-diphenylmethane dianhydride.

Out of these, 2,3,5-tricarboxycyclopentylacetic dianhydride, butanetetracarboxylic dianhydride, 1,3-dimethyl-1,2,3,4-cyclobutanetetracarboxylic dianhydride, 1,2,3,4-cyclobutanetetracarboxylic dianhydride, pyromellitic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride and 3,3',4,4'-biphenylether tetracarboxylic dianhydride are preferred. They may be used alone or in combination of two or more.

Examples of the another diamine compound include aromatic diamines such as p-phenylenediamine, m-phenylenediamine, 4,4'-diaminodiphenylmethane, 4,4'-diaminodiphenylethane, 4,4'-diaminodiphenylsulfide, 4,4'-diaminodiphenylsulfone, 3,3'-dimethyl-4,4'-diaminobiphenyl, 4,4'-diaminobenzanilide, 4,4'-diaminodiphenylether, 1,5-diaminonaphthalene, 3,3-dimethyl-4,4'-diaminobiphenyl, 5-amino-1(4'-aminophenyl)-1,3,3-trimethylindane, 6-amino-1(4'-aminophenyl)-1,3,3-trimethylindane, 3,4'-diaminodiphenylether, 2,2-bis(4-aminohphenoxy)propane, 2,2-bis[4(4-aminophenoxy)phenyl]propane, 2,2-bis[4(4-aminophenoxy)phenyl]hexafluoropropane, 2,2-bis(4-aminophenyl)hexafluoropropane, 2,2-bis[4(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'(p-phenyleneisopropylidene)bisaniline, 4,4'(m-phenyleneisopropylidene)bisaniline, 2,2'-bis[4(4-amino-2-trifluoromethylphenoxy)phenyl]hexafluoropropane, 4,4'-diamino- 2,2'-bis(trifluoromethyl)biphenyl and 4,4'-bis[(4-amino-2-trifluoromethyl)phenoxy]-octafluorobiphenyl; aromatic diamines having a hetero atom such as diaminotetraphenylthiophene; aliphatic and alicyclic diamines such as 1,1-metaxylylenediamine, 1,3-propanediamine, tetramethylenediamine, pentamethylenediamine, hexamethylenediamine, heptamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricycle [6.2.1.0$_{2,7}$]-undecylenedimethyldiamine and 4,4'-methylenebis(cyclohexylamine); and diaminoorganosiloxanes such as diaminohexamethyldisiloxane.

Out of these, p-phenylenediamine, 4,4'-diaminodiphenylmethane, 1,5-diaminonaphthalene, 2,7-diaminofluorene, 4,4'-diaminodiphenylether, 4,4'(p-phenyleneisopropylidene)bisaniline, 2,2-bis[4(4-aminophenoxy)phenyl]hexafluoropropane, 2,2-bis(4-aminophenyl)hexafluoropropane, 2,2'-bis[4(4-amino-2-trifluoromethylphenoxy)phenyl]hexafluoropropane, 4,4'-diamino-2,2'-bis(trifluoromethyl)biphenyl and 4,4'-bis[(4-amino-2-trifluoromethyl)phenoxy]-octafluorobiphenyl are preferred. They may be used alone or in combination of two or more.

The polyimide used in the present invention is obtained by polycondensing (a) the above tetracarboxylic dianhydride component with (b) the above diamine component to obtain a polyamic acid and imidizing the polyamic acid by heating, if necessary, in the presence of a dehydrating agent and an imidizing catalyst. When the polyamic acid is imidized by heating, the reaction temperature is generally 60 to 300° C., preferably 100 to 170° C. When the reaction temperature is lower than 60° C., the proceeding of the reaction slows down. When the reaction temperature is higher than 300° C., the molecular weight of the polyamic acid may become greatly lower. The imidization reaction in the presence of a dehydrating agent and an imidizing catalyst can be carried out in an organic solvent. The reaction temperature is generally 0 to 180° C., preferably 60 to 150° C. Examples of the dehydrating agent include acid anhydrides such as acetic anhydride, propionic anhydride and trifluoroacetic anhydride. Examples of the imidizing catalyst include tertiary amines such as pyridine, collidine, lutidine and triethylamine. The amount of the dehydrating agent is preferably 1.6 to 20 mols based on 1 mol of the recurring unit of the polyamic acid. The amount of the imidizing catalyst is 0.5 to 10 mols based on 1 mol of the dehydrating agent. The content of the residual amic acid in the polyimide can be controlled by the amounts of the imidizing catalyst and the dehydrating agent.

Polystyrene and styrene/maleimide copolymer which are examples of the polymer I are obtained by radically polymerizing a styrene derivative, or a styrene derivative and a phenylmaleimide derivative in the presence of an initiator. The polystyrene and styrene/maleimide copolymer used in the present invention are obtained by using a compound having the structure (A) and a compound having the structure (B) as at least one of the styrene derivative and phenylmaleimide derivative components.

Examples of the styrene derivative having the structure (A) include 4-(4-chalconyloxy)styrene, 4-(4-chalconyloxy)α-methylstyrene, 4-(2-(4-chalconyloxy)ethoxy)styrene, 4-(2-(4-chalconyloxy)ethoxy)α-methylstyrene, 4-(4-(4-chalconyloxy)butoxy)styrene, 4-(4-(4-chalconyloxy)butoxy)α-methylstyrene, 4-(6-(4-chalconyloxy)hexanoxy)styrene, 4-(6-(4-chalconyloxy)hexanoxy)α-methylstyrene, 4-(8-(4-chalconyloxy)octanoxy)styrene, 4-(8-(4-chalconyloxy)octanoxy)α-methylstyrene, 4-(4-chalconylcarboxy)styrene, 4-(4-chalconylcarboxy)α-methylstyrene, 4-(2-(4-chalconylcarboxy)ethoxy)styrene, 4-(2-(4-chalconylcarboxy)ethoxy)α-methylstyrene, 4-(4-(4-chalconylcarboxy)butoxy)styrene, 4-(4-(4-chalconylcarboxy)butoxy)α-methylstyrene, 4-(6-(4-chalconylcarboxy)hexanoxy)styrene, 4-(6-(4-chalconylcarboxy)hexanoxy)α-methylstyrene, 4-(8-(4-chalconylcarboxy)octanoxy)styrene, 4-(8-(4-chalconylcarboxy)octanoxy)α-methylstyrene, 4-(2-(4-chalconyl)ethoxy)styrene, 4-(2-(4-chalconyl)ethoxy)α-methylstyrene, 4-(4-(4-chalconyl)butoxy)styrene, 4-(4-(4-chalconyl)butoxy)α-methylstyrene, 4-(6-(4-chalconyl)hexanoxy)styrene, 4-(6-(4-chalconyl)hexanoxy)α-methylstyrene, 4-(8-(4-chalconyl)octanoxy)styrene, 4-(8-(4-chalconyl)octanoxy)α-methylstyrene, 4-(2-(4-chalconyloxy)ethyl)styrene, 4-(2-(4-chalconyloxy)ethyl)α-methylstyrene, 4-(4-(4-chalconyloxy)butyl)styrene, 4-(4-(4-chalconyloxy)butyl)α-methylstyrene, 4-(6-(4-chalconyloxy)hexyl)styrene, 4-(6-(4-chalconyloxy)hexyl)α-methylstyrene, 4-(8-(4-chalconyloxy)octyl)styrene, 4-(8-(4-chalconyloxy)octyl)α-methylstyrene, 4-(2-(4-chalconylcarboxy)ethyl)styrene, 4-(2-(4-chalconylcarboxy)ethyl)α-methylstyrene, 4-(4-(4-chalconylcarboxy)butyl)styrene, 4-(4-(4-chalconylcarboxy)butyl)α-methylstyrene, 4-(6-(4-chalconylcarboxy)hexyl)styrene, 4-(6-(4-chalconylcarboxy)hexyl)α-methylstyrene, 4-(8-(4-chalconylcarboxy)octyl)styrene, 4-(8-(4-chalconylcarboxy)octyl)α-methylstyrene, 4-(2-(4-chalconyl)ethyl)styrene, 4-(2-(4-chalconyl)ethyl)α-methylstyrene, 4-(4-(4-chalconyl)butyl)styrene, 4-(4-(4-chalconyl)butyl)α-methylstyrene, 4-(6-(4-chalconyl)hexyl)styrene, 4-(6-(4-chalconyl)hexyl)α-methylstyrene, 4-(8-(4-chalconyl)octyl)styrene, 4-(8-(4-chalconyl)octyl)α-methylstyrene, 4-(4-chalconyloxymethyl)styrene, 4-(4-chalconyloxymethyl)α-methylstyrene, 4-(2-(4-chalconyloxy)ethoxymethyl)styrene, 4-(2-(4-chalconyloxy)ethoxymethyl)α-methylstyrene, 4-(4-(4-chalconyloxy)butoxymethyl)styrene, 4-(4-(4-chalconyloxy)butoxymethyl)α-methylstyrene, 4-(6-(4-chalconyloxy)hexanoxymethyl)styrene, 4-(6-(4-chalconyloxy)hexanoxymethyl)α-methylstyrene, 4-(8-(4-chalconyloxy)octanoxymethyl)styrene, 4-(8-(4-chalconyloxy)octanoxymethyl)α-methylstyrene, 4-(4-chalconylcarboxymethyl)styrene, 4-(4-chalconylcarboxymethyl)α-methylstyrene, 4-(2-(4-chalconylcarboxy)ethoxymethyl)styrene, 4-(2-(4-chalconylcarboxy)ethoxymethyl)α-methylstyrene, 4-(4-(4-chalconylcarboxy)butoxymethyl)styrene, 4-(4-(4-chalconylcarboxy)butoxymethyl)α-methylstyrene, 4-(6-(4-chalconylcarboxy)hexanoxymethyl)styrene, 4-(6-(4-chalconylcarboxy)hexanoxymethyl)α-methylstyrene, 4-(8-(4-chalconylcarboxy)octanoxymethyl)styrene, 4-(8-(4-chalconylcarboxy)octanoxymethyl)α-methylstyrene, 4-(2-(4-chalconyl)ethoxymethyl)styrene, 4-(2-(4-chalconyl)ethoxymethyl)α-methylstyrene, 4-(4-(4-chalconyl)butoxymethyl)styrene, 4-(4-(4-chalconyl)butoxymethyl)α-methylstyrene, 4-(6-(4-chalconyl)hexanoxymethyl)styrene, 4-(6-(4-chalconyl)hexanoxymethyl)α-methylstyrene, 4-(8-(4-chalconyl)octanoxymethyl)styrene, 4-(8-(4-chalconyl)octanoxymethyl)α-methylstyrene, 4-(4'-fluoro-4-chalconyloxy)styrene, 4-(4'-fluoro-4-chalconyloxy)α-methylstyrene, 4-(2-(4'-fluoro-4-chalconyloxy)ethoxy)styrene, 4-(2-(4'-fluoro-4-chalconyloxy)ethoxy)α-methylstyrene, 4-(4-(4'-fluoro-4-chalconyloxy)butoxy)styrene, 4-(4-(4'-fluoro-4-chalconyloxy)butoxy)α-methylstyrene, 4-(6-(4'-fluoro-4-chalconyloxy)hexanoxy)styrene, 4-(6-(4'-fluoro-4-chalconyloxy)hexanoxy)α-methylstyrene, 4-(8-(4'-fluoro-4- chalconyloxy)octanoxy)styrene, 4-(8-(4'-fluoro-4-chalconyloxy)octanoxy)α-methylstyrene, 4-(4'-fluoro-4-chalconylcarboxy)styrene, 4-(4'-fluoro-4-chalconylcarboxy)α-methylstyrene, 4-(2-(4'-fluoro-4-chalconylcarboxy)ethoxy)styrene, 4-(2-(4'-fluoro-4-chalconylcarboxy)ethoxy)α-methylstyrene, 4-(4-(4'-fluoro-4-chalconylcarboxy)butoxy)styrene, 4-(4-(4'-fluoro-4-chalconylcarboxy)butoxy)α-methylstyrene, 4-(6-(4'-fluoro-4-chalconylcarboxy)hexanoxy)styrene, 4-(6-(4'-fluoro-4-chalconylcarboxy)hexanoxy)α-methylstyrene, 4-(8-(4'-fluoro-4-chalconylcarboxy)octanoxy)styrene, 4-(8-(4'-fluoro-4-chalconylcarboxy)octanoxy)α-methylstyrene, 4-(2-(4'-fluoro-4-chalconyl)ethoxy)styrene, 4-(2-(4'-fluoro-4-chalconyl)ethoxy)α-methylstyrene, 4-(4-(4'-fluoro-4-chalconyl)butoxy)styrene, 4-(4-(4'-fluoro-4-chalconyl)butoxy)α-methylstyrene, 4-(6-(4'-fluoro-4-chalconyl)hexanoxy)styrene, 4-(6-(4'-fluoro-4-chalconyl)hexanoxy)α-methylstyrene, 4-(8-(4'-fluoro-4-chalconyl)octanoxy)styrene, 4-(8-(4'-fluoro-4-chalconyl)octanoxy)α-methylstyrene, 4-(2-(4'-fluoro-4-chalconyloxy)ethyl)styrene, 4-(2-(4'-fluoro-4-chalconyloxy)ethyl)α-methylstyrene, 4-(4-(4'-fluoro-4-chalconyloxy)butyl)styrene, 4-(4-(4'-fluoro-4-chalconyloxy)butyl)α-methylstyrene, 4-(6-(4'-fluoro-4-chalconyloxy)hexyl)styrene, 4-(6-(4'-fluoro-4-chalconyloxy)hexyl)α-methylstyrene, 4-(8-(4'-fluoro-4-chalconyloxy)octyl)styrene, 4-(8-(4'-fluoro-4-chalconyloxy)octyl)α-methylstyrene, 4-(2-(4'-fluoro-4-chalconylcarboxy)ethyl)styrene, 4-(2-(4'-fluoro-4-chalconylcarboxy)ethyl)α-methylstyrene, 4-(4-(4'-fluoro-4-chalconylcarboxy)butyl)styrene, 4-(4-(4'-fluoro-4-chalconylcarboxy)butyl)α-methylstyrene, 4-(6-(4'-fluoro-4-chalconylcarboxy)hexyl)styrene, 4-(6-(4'-fluoro-4-chalconylcarboxy)hexyl)α-methylstyrene, 4-(8-(4'-fluoro-4-chalconylcarboxy)octyl)styrene, 4-(8-(4'-fluoro-4-chalconylcarboxy)octyl)α-methylstyrene, 4-(2-(4'-fluoro-4-chalconyl)ethyl)styrene, 4-(2-(4'-fluoro-4-chalconyl)ethyl)α-methylstyrene, 4-(4-(4'-fluoro-4-chalconyl)butyl)styrene, 4-(4-(4'-fluoro-4-chalconyl)butyl)α-methylstyrene, 4-(6-(4'-fluoro-4-chalconyl)hexyl)styrene, 4-(6-(4'-fluoro-4-chalconyl)hexyl)α-methylstyrene, 4-(8-(4'-fluoro-4-chalconyl)octyl)styrene, 4-(8-(4'-fluoro-4-chalconyl)octyl)α-methylstyrene, 4-(4'-fluoro-4-chalconyloxymethyl)styrene, 4-(4'-fluoro-4-chalconyloxymethyl)α-methylstyrene, 4-(2-(4'-fluoro-4-chalconyloxy)ethoxymethyl)styrene, 4-(2-(4'-fluoro-4-chalconyloxy)ethoxymethyl) α-methylstyrene, 4-(4-(4'-fluoro-4-chalconyloxy)butoxymethyl)styrene, 4-(4-(4'-fluoro-4-chalconyloxy)butoxymethyl)α-methylstyrene, 4-(6-(4'-fluoro-4-chalconyloxy)hexanoxymethyl)styrene, 4-(6-(4'-fluoro-4-chalconyloxy)hexanoxymethyl)α-methylstyrene, 4-(8-(4'-fluoro-4-chalconyloxy)octanoxymethyl)styrene, 4-(8-(4'-fluoro-4-chalconyloxy)octanoxymethyl)α-methylstyrene, 4-(2-(4'-fluoro-4-chalconyl)ethoxymethyl)styrene, 4-(2-(4'-fluoro-4-chalconyl)ethoxymethyl)α-methylstyrene, 4-(4'-fluoro-4-carchonylcarboxymethyl)styrene, 4-(4'-fluoro-4-carchonylcarboxymethyl)α-methylstyrene, 4-(2-(4'-fluoro-4-carchonylcarboxy)ethoxymethyl)styrene, 4-(2-(4'-fluoro-4-carchonylcarboxy)ethoxymethyl) α-methylstyrene, 4-(4-(4'-fluoro-4-chalconylcarboxy)butoxymethyl)styrene, 4-(4-(4'-fluoro-4-chalconylcarboxy)butoxymethyl)α-methylstyrene, 4-(6-(4'-fluoro-4-chalconylcarboxy)hexanoxymethyl) styrene, 4-(6-(4'-fluoro-4-chalconylcarboxy)hexanoxymethyl)α-methylstyrene, 4-(8-(4'-fluoro-4-chalconylcarboxy)octanoxymethyl) styrene, 4-(8-(4'-fluoro-4-chalconylcarboxy)octanoxymethyl)α-methylstyrene, 4-(2-(4'-fluoro-4-carchonyl)ethoxymethyl)styrene, 4-(2-(4'-fluoro-4-carchonyl)ethoxymethyl)α-methylstyrene, 4-(4-(4'-fluoro-4-chalconyl)butoxymethyl)styrene, 4-(4-(4'-fluoro-4-chalconyl)butoxymethyl)α-methylstyrene, 4-(6-(4'-fluoro-4-chalconyl)hexanoxymethyl)styrene, 4-(6-(4'-fluoro-4-chalconyl)hexanoxymethyl)α-methylstyrene, 4-(8-(4'-fluoro-4-chalconyl)octanoxymethyl)styrene, 4-(8-(4'-fluoro-4-chalconyl)octanoxymethyl)α-methylstyrene, 4-(3-(4-vinylphenyl)propionyloxy)-4'-fluorochalcone, 4-(3-(4-vinylphenyl)propionyloxy)chalcone and compounds represented by the following formulas (38) to (45).

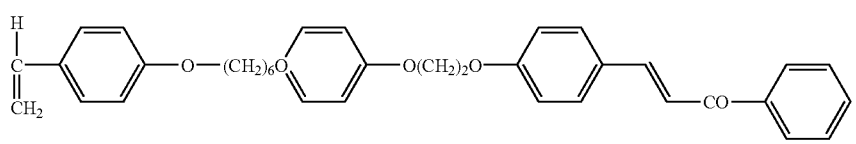

(38)

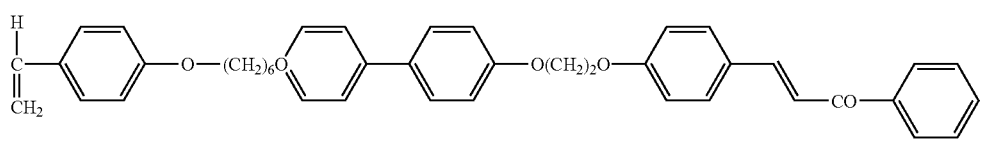

(39)

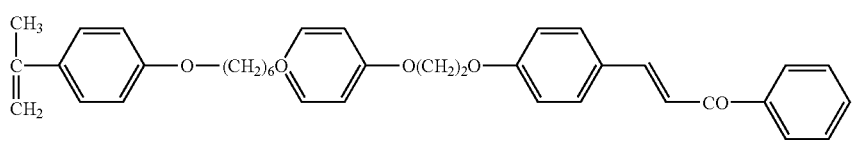

(40)

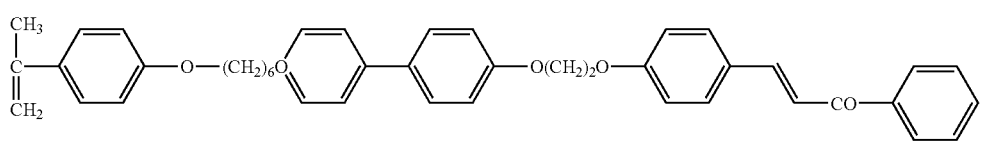

(41)

-continued

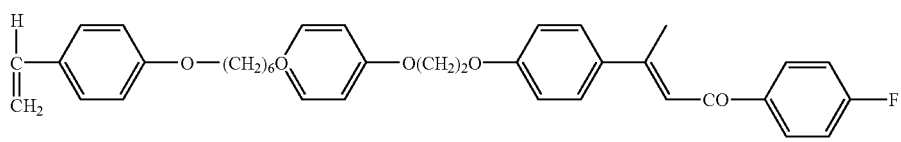

(42)

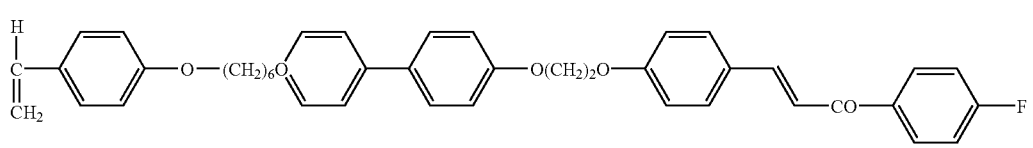

(43)

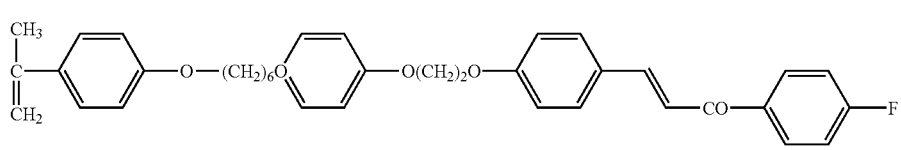

(44)

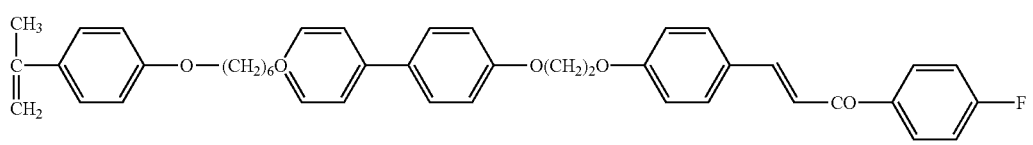

(45)

Out of these, 4-(6-(4-chalconyloxy)hexanoxy)styrene, 4-(6-(4-chalconyloxy)octanoxy)styrene and compounds represented by the above formulas (38) to (45) are preferred. They may be used alone or in combination of two or more.

Examples of the maleimide derivative having the structure (A) include 4-(4-chalconyloxy)phenylmaleimide, 4-(2-(4-chalconyloxy)ethoxy)phenylmaleimide, 4-(4-(4-chalconyloxy)butoxy)phenylmaleimide, 4-(6-(4-chalconyloxy)hexanoxy)phenylmaleimide, 4-(8-(4-chalconyloxy)octanoxy)phenylmaleimide, 4-(4-chalconylcarboxy)phenylmaleimide, 4-(2-(4-chalconylcarboxy)ethoxy)phenylmaleimide, 4-(4-(4-chalconylcarboxy)butoxy)phenylmaleimide, 4-(6-(4-chalconylcarboxy)hexanoxy)phenylmaleimide, 4-(8-(4-chalconylcarboxy)octanoxy)phenylmaleimide, 4-(2-(4-chalconyl)ethoxy)phenylmaleimide, 4-(4-(4-chalconyl)butoxy)phenylmaleimide, 4-(6-(4-chalconyl)hexanoxy)phenylmaleimide, 4-(8-(4-chalconyl)octanoxy)phenylmaleimide, 4-(2-(4-chalconyloxy)ethyl)phenylmaleimide, 4-(4-(4-chalconyloxy)butyl)phenylmaleimide, 4-(6-(4-chalconyloxy)hexyl)phenylmaleimide, 4-(8-(4-chalconyloxy)octyl)phenylmaleimide, 4-(2-(4-chalconylcarboxy)ethyl)phenylmaleimide, 4-(4-(4-chalconylcarboxy)butyl)phenylmaleimide, 4-(6-(4-chalconylcarboxy)hexyl)phenylmaleimide, 4-(8-(4-chalconylcarboxy)octyl)phenylmaleimide, 4-(2-(4-chalconyl)ethyl)phenylmaleimide, 4-(4-(4-chalconyl)butyl)phenylmaleimide, 4-(6-(4-chalconyl)hexyl)phenylmaleimide, 4-(8-(4-chalconyl)octyl)phenylmaleimide, 4-(4'-fluoro-4-chalconyloxy)phenylmaleimide, 4-(2-(4'-fluoro-4-chalconyloxy)ethoxy)phenylmaleimide, 4-(4-(4'-fluoro-4-chalconyloxy)butoxy) phenylmaleimide, 4-(6-(4'-fluoro-4-chalconyloxy)hexanoxy)phenylmaleimide, 4-(8-(4'-fluoro-4-chalconyloxy)octanoxy)phenylmaleimide, 4-(4'-fluoro-4-chalconylcarboxy) phenylmaleimide, 4-(2-(4'-fluoro-4-chalconylcarboxy)ethoxy) phenylmaleimide, 4-(4-(4'-fluoro-4-chalconylcarboxy)butoxy) phenylmaleimide, 4-(6-(4'-fluoro-4-chalconylcarboxy)hexanoxy) phenylmaleimide, 4-(8-(4'-fluoro-4-chalconylcarboxy)octanoxy) phenylmaleimide, 4-(2-(4'-fluoro-4-chalconyl)ethoxy)phenylmaleimide, 4-(4-(4'-fluoro-4-chalconyl)butoxy)phenylmaleimide, 4-(6-(4'-fluoro-4-chalconyl)hexanoxy)phenylmaleimide, 4-(8-(4'-fluoro-4-chalconyl)octanoxy)phenylmaleimide, 4-(2-(4'-fluoro-4-chalconyloxy)ethyl)phenylmaleimide, 4-(4-(4'-fluoro-4-chalconyloxy)butyl)phenylmaleimide, 4-(6-(4'-fluoro-4-chalconyloxy)hexyl)phenylmaleimide, 4-(8-(4'-fluoro-4-chalconyloxy)octyl)phenylmaleimide, 4-(2-(4'-fluoro-4-chalconylcarboxy)ethyl)phenylmaleimide, 4-(4-(4'-fluoro-4-chalconylcarboxy)butyl)phenylmaleimide, 4-(6-(4'-fluoro-4-chalconylcarboxy)hexyl)phenylmaleimide, 4-(8-(4'-fluoro-4-chalconylcarboxy)octyl)phenylmaleimide, 4-(2-(4'-fluoro-4-chalconyl)ethyl)phenylmaleimide, 4-(4-(4'-fluoro-4-chalconyl)butyl)phenylmaleimide, 4-(6-(4'-fluoro-4-chalconyl)hexyl)phenylmaleimide, 4-(8-(4'-fluoro-4-chalconyl)octyl)phenylmaleimide, 4-(8-(4'-fluoro-4-chalconyloxy)octanoxymethyl) phenylmaleimide, 4-(8-(4'-fluoro-4-chalconylcarboxy)octanoxymethyl) phenylmaleimide, 4-(2-(4'-fluoro-4-chalconyl)ethoxymethyl)phenylmaleimide, 4-(4-(4'-fluoro-4-chalconyl)butoxymethyl)phenylmaleimide, 4-(6-(4'-fluoro-4-chalconyl)hexanoxymethyl) phenylmaleimide, 4-(8-(4'-fluoro-4-chalconyl)octanoxymethyl) phenylmaleimide and compounds represented by the following formulas (46) to (49).

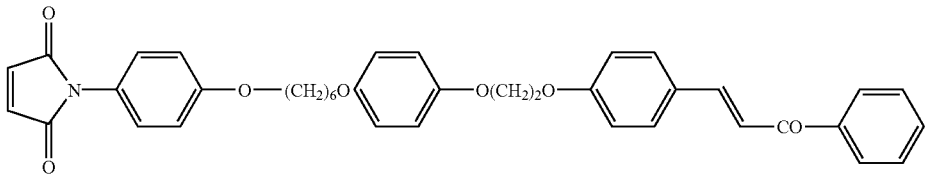

(46)

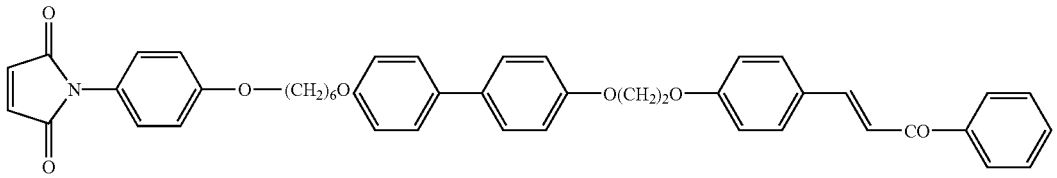

(47)

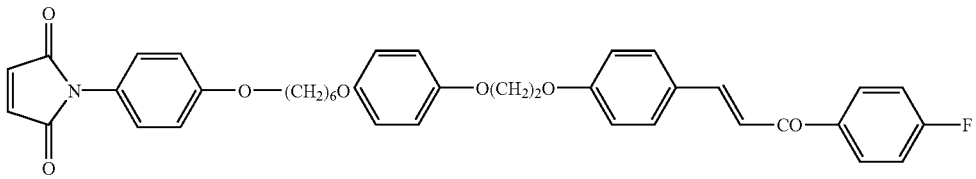

(48)

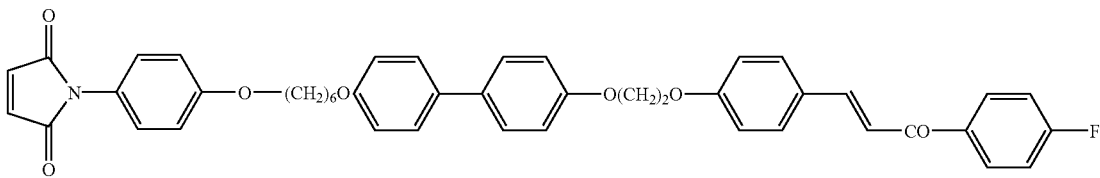

(49)

Out of these, 4-(6-(4-chalconyloxy)hexanoxy)phenylmaleimide, 4-(8-(4-chalconyloxy)octanoxy)phenylmaleimide, 4-(6-(4'-fluoro-4-chalconyloxy)hexyl)phenylmaleimide, 4-(8-(4'-fluoro-4-chalconyloxy)octyl)phenylmaleimide and compounds represented by the above formulas (46) to (49) are preferred. They may be used alone or in combination of two or more.

Examples of the styrene derivative having the structure (B) include p-trifluoromethylstyrene, p-trifluoromethyl-α-methylstyrene, p-trifluoromethoxystyrene, p-trifluoromethoxy-α-methylstyrene, 4-(2,2,2-trifluoroethoxy)styrene, 4-(2,2,2-trifluoroethoxy)-α-methylstyrene, p-cetyloxystyrene, p-cetyloxy-α-methylstyrene, p-palmitoyloxystyrene, p-palmitoyloxy-α-methylstyrene, p-stearyloxystyrene, p-stearyloxy-α-methylstyrene, p-stearoyloxystyrene, p-stearoyloxy-α-methylstyrene, p-cholesteryloxystyrene, p-cholesteryloxy-α-methylstyrene, p-cholestanyloxystyrene and p-cholestanyloxy-α-methylstyrene.

Examples of the maleimide derivative having the structure (B) include 4-trifluoromethylphenylmaleimide, 4-trifluoromethoxyphenylmaleimide, 4-(2,2,2-trifluoroethoxy) phenylmaleimide, 4-cetyloxyphenylmaleimide, 4-palmitoyloxyphenylmaleimide, 4-stearyloxyphenylmaleimide, 4-stearoyloxyphenylmaleimide, 4-cholesteryloxyphenylmaleimide and 4-cholestanyloxyphenylmaleimide.

The polystyrene and styrene/maleimide copolymer used in the present invention may be a copolymer having the structures (A), (B) and (C) obtained by copolymerizing a monomer having the structure (C).

Examples of the monomer having the structure (C) include glycidyl acrylate, glycidyl methacrylate, glycidyl α-ethylacrylate, glycidyl α-n-propylacrylate, glycidyl α-n-butylacrylate, 3,4-epoxybutyl acrylate, 3,4-epoxybutyl methacrylate, 6,7-epoxyheptyl acrylate, 6,7-epoxyheptyl methacrylate, 6,7-epoxyheptyl α-ethylacrylate, o-vinylbenzyl glycidyl ether, m-vinylbenzyl glycidyl ether and p-vinylbenzyl glycidyl ether. These monomers may be used alone or in combination.

The polystyrene and styrene/maleimide copolymer used in the present invention may be used in conjunction with another radically polymerizable monomer in limits that do not impair the effect of the present invention. The another radically polymerizable monomer is used in an amount of preferably 50 mol % based on the amount of styrene in the case of polystyrene or the total amount of styrene and maleimide in the case of the styrene/maleimide copolymer.

Examples of the another radically polymerizable monomer include aliphatic (meth)acrylate compounds such as methyl (meth)acrylate, ethyl (meth)acrylate, n-butyl (meth) acrylate, i-butyl (meth)acrylate, 2-hydroxyethyl (meth)acrylate, 2-hydroxypopyl (meth)acrylate, 2-ethylhexyl (meth) acrylate, polyethylene glycol mono(meth)acrylate and trimethylolpropane tri(meth)acrylate; alicyclic (meth)acrylate compounds such as tetrahydrofurfuryl (meth)acrylate, cyclohexyl (meth)acrylate, glycidyl (meth)acrylate, dicyclopentadiene (meth)acrylate, dicyclopentanyl (meth)acrylate, tricyclodecanyl (meth)acrylate and isobornyl (meth)acrylate; aromatic (meth)acrylate compounds such as 4-(meth) acryloyloxychalcone, 4-(meth)acryloyloxy-4'-phenylchalcone, 4-(meth)acryloyloxy-4'-pentylchalcone, 4-(meth) acryloyloxy-4'-(4-pentylphenyl)chalcone, benzyl (meth) acrylate, 2-hydroxy-3-phenyloxypropyl (meth)acrylate and tris(2-hydroxyethyl)isocyanurate tri(meth)acrylate; vinyl compounds such as ethylene, propylene, butene, styrene, p-methylstyrene, p-trifluoromethylstyrene, α-methylstyrene, p-trifluoromethyl-α-methylstyrene, 4(4-trifluoromethylbenzoyloxy)styrene, p-cetyloxystyrene, p-palmitoyloxystyrene, 4-trifluoromethylphenyl-3(4-vinylphenyl)propionate, 4-cetyl-3(4-vinylphenyl)propionate, 4-stearyl-3(4-vinylphenyl)propionate, vinyl chloride, vinyl acetate and acrylonitrile; maleic acid derivatives such as maleic anhydride and phenylmaleimide; and dienes such as butadiene, isoprene and chloroprene.

Out of these, styrene, p-methylstyrene and α-methylstyrene are preferred. They may be used alone or in combination of two or more.

The polystyrene and styrene/maleimide copolymer used in the present invention are obtained by polymerizing the above styrene derivative and/or maleimide derivative optionally in the presence of a catalyst, e.g., an azo compound such as azobisisobutyronitrile or a perchloride such as benzoyl peroxide. These polymers may be used alone or in combination of two or more.

As an alternative method of obtaining the polystyrene and styrene/maleimide copolymer used in the present invention, an acetoxy-substituted styrene derivative and/or acetoxy-substituted phenylmaleimide derivative are/is radically polymerized with a monomer having the structure (B) and a monomer having the structure (C), and then the above acetyl group is substituted by a functional group having the structure (A).

Polymer having structure (C)

The polymer having the structure (C) is preferably a polymer obtained by copolymerizing the above monomer having the structure (C) optionally with the above another radically polymerizable monomer, or an epoxy resin.

Examples of the epoxy resin include epoxy resins represented by the following formula (i) such as bisphenol A epoxy resin and bisphenol F epoxy resin; epoxy resins represented by the following formula (ii) such as phenol novolak epoxy resin and cresol novolak epoxy resin; and epoxy resins represented by the following formula (iii) such as polyfunctional epoxy resin.

In the above formulas, X is a methylene group, alkylene group having 2 to 6 carbon atoms, fluoroalkylene group having 2 to 6 carbon atoms or divalent organic group having an alicyclic skeleton, R is an alkyl group having 1 to 3 carbon atoms, Y is an organic group having a valence of p, m is an integer of 0 to 4, m' is an integer of 0 to 3, and n and p are each an integer of 2 or more.

These epoxy resins can be acquired as commercially available products. Commercially available products of the bisphenol A epoxy resin include Epicoat 828, 1001, 1002, 1003, 1004, 1007, 1009 and 1010 (of Yuka Shell Epoxy Co., Ltd.), those of the bisphenol F epoxy resin include Epicoat 807 and 834 (of Yuka Shell Epoxy Co., Ltd.), those of the phenol novolak epoxy resin include Epicoat 152, 154 and 157H65 (of Yuka Shell Epoxy Co., Ltd.) and EPPN201 and 202 (of Nippon Kayaku Co., Ltd.), those of the cresol novolak epoxy resin include EOCN-102, EOCN-103S, EOCN-104S, EOCN-1020, EOCN-1025 and EOCN-1027 (of Nippon Kayaku Co., Ltd.) and Epicoat 180S75 (of Yuka Shell Epoxy Co., Ltd.), those of alicyclic epoxy resins include Araldyte CY175, CY177 and CY179 (of Ciba Specialty Chemicals Co., Ltd.), ERL-4234, ERL-4299, ERL-4221 and ERL-4206 (of U.C.B. Co., Ltd.), Showdyne 509 (of Showa Denko K.K.), Araldyte CY-182, CY-192 and CY-184 (of Ciba Specialty Chemicals Co., Ltd.), Epichlon 200 and 400 (of Dainippon Ink and Chemicals, Inc.), Epicoat 871 and 872 and EP1032H60 (of Yuka Shell Epoxy Co., Ltd.), ED-5661 and ED-5662 (of Ceranies Coating Co., Ltd.), and those of aliphatic polyglycidyl ethers include Epicoat 190P and 191P (of Yuka Shell Epoxy Co., Ltd.), Epolite 100MF (Kyoeisha Kagaku) and Epiol TMP (of NOF Corporation).

Compound (C')

The compound (C') used in the present invention is preferably an epoxy compound. Preferred examples of the epoxy compound include ethylene glycol diglycidyl ether, polyethylene glycol diglycidyl ether, propylene glycol diglycidyl ether, tripropylene glycol diglycidyl ether, polypro-

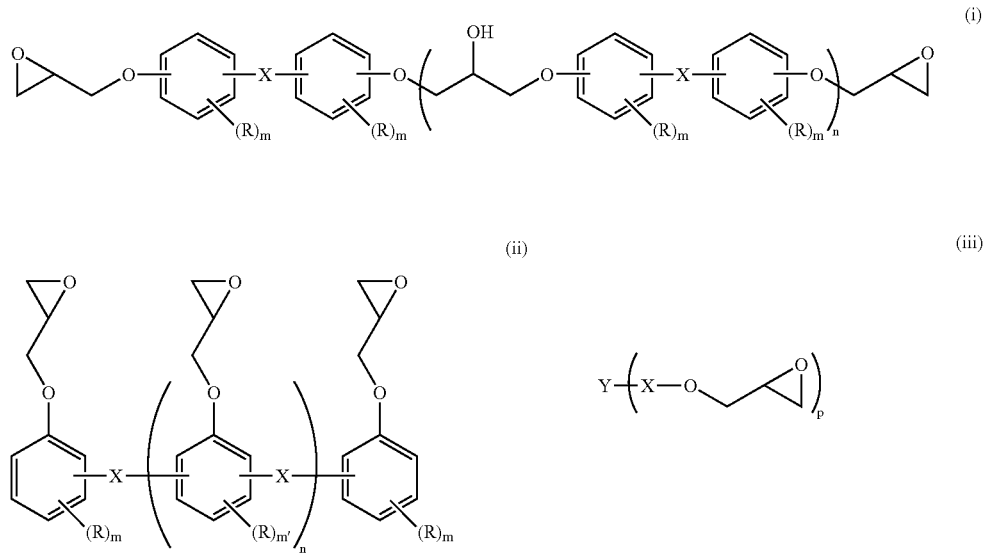

pylene glycol diglycidyl ether, neopentyl glycol diglycidyl ether, 1,6-hexanediol diglycidyl ether, glycerine diglycidyl ether, 2,2-dibromoneopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl)cyclohexane and N,N,N',N'-tetraglycidyl-4,4'-diaminodiphenylmethane.

Solvent

The liquid crystal aligning agent of the present invention is prepared as a solution of the above polymer component. The solvent used for the preparation of this solution is not particularly limited if it is an organic solvent capable of dissolving the polymer component. Examples of the solvent when polyimide is used as the polymer component include aprotic polar solvents such as N-methyl-2-pyrrolidone, N,N-dimethylacetamide, N,N-dimethylformamide, dimethylsulfoxide, γ-butyrolactone, tetramethylurea, dimethylimidazolidinone and hexamethylphosphortriamide; ester-based solvents such as butyl cellosolve acetate, propyl acetate, isopropyl acetate, butyl acetate, isobutyl acetate, pentyl acetate and isopentyl acetate; ketone-based solvents such as methyl ethyl ketone, methyl butyl ketone, methyl isobutyl ketone, cyclohexanone and methyl cyclohexanone; halogen-based solvents such as chlorobenzene, orthodichlorobenzene, tetrachloroethylene and 1,1,1-trichloroethane; and phenol-based solvents such as m-cresol, xylenol, phenol and halogenated phenol. They may be used alone or in combination of two or more. A poor solvent for the used polymer may be used in conjunction with the above solvent in limits that the polymer does not separate out.

The liquid crystal aligning agent of the present invention may contain a functional silane-containing compound to improve adhesion to a substrate. Examples of the functional silane-containing compound include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-dizanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane and a reaction product of a tetracarboxylic dianhydride and amino group-containing silane compound disclosed in JP-A 63-291922.

Liquid Crystal Alignment Film

For example, the following method is used to form a liquid crystal alignment film from the liquid crystal aligning agent of the present invention. The liquid crystal aligning agent of the present invention is first applied to the transparent conductive film side of a substrate having the transparent conductive film by roll coating, spinner coating or printing and heated at 40 to 200° C. to form a coating film. The thickness of the coating film is preferably 0.001 to 1 μm, more preferably 0.005 to 0.5 μm.

The above substrate is, for example, a transparent substrate made from glass such as float glass or soda glass, or a plastic film of polyethylene terephthalate, polybutylene terephthalate, polyether sulfone or polycarbonate.

The above transparent conductive film is, for example, an NESA film of $SnO_2$ or ITO film of $In_2O_3$—$SnO_2$. A photo-etching technique or masking technique is used for the patterning of the transparent conductive film.

Before the application of the liquid crystal aligning agent, to improve adhesion between the substrate/transparent conductive film and the coating film, a functional silane-containing compound or titanate may be applied to the substrate/transparent conductive film.

Thereafter, the above coating film is exposed to light, preferably linearly polarized radiation. The used radiation is preferably ultraviolet to visible radiation having a wavelength of 150 to 800 nm, particularly preferably ultraviolet radiation having a wavelength of 240 to 450 nm.

The light source of the above radiation is, for example, a low-pressure mercury lamp, high-pressure mercury lamp, deuterium lamp, metal halide lamp, argon resonance lamp, xenon lamp, excimer laser or the like.

When the liquid crystal aligning agent (2) or (3) is used, the above coating film is preferably exposed to light under heating at room temperature (25° C.) or higher. The heating temperature is preferably 30 to 300° C., more preferably 30 to 200° C.

The heating time is preferably 1 second to 1 hour, particularly preferably 1 second to 5 minutes.

This heating step can be carried out simultaneously with the step of thermally curing a sealer to seal the peripheral portion of a liquid crystal cell in the production process of a liquid crystal display element.

Liquid Crystal Display Element

The liquid crystal display element of the present invention is obtained as follows. Two substrates having the above liquid crystal alignment film are opposed to each other in such a manner that the polarization directions of linearly polarized radiations irradiated onto the liquid crystal alignment films form a predetermined angle, a peripheral portion between the substrates was sealed with a sealer, liquid crystals are filled into a gap between the substrates, and a filling hole is sealed to construct a liquid crystal cell. A polarizer is affixed to the both sides of the obtained liquid crystal cell in such a manner that the polarization directions of the polarizers and the polarization directions of the linearly polarized radiations irradiated onto the liquid crystal alignment films of the substrates form a predetermined angle to construct a liquid crystal display element. The angle formed by the polarization directions of the linearly polarized radiations on the two substrates having the liquid crystal alignment film and the angle between each of the substrates and each of the polarizers are adjusted to obtain a liquid crystal display element having an TN or STN liquid crystal cell.

The above sealer is, for example, an epoxy resin containing aluminum oxide spheres or the like as a curing agent and spacer.

The above liquid crystals are, for example, nematic or smectic liquid crystals. In the case of a TN liquid crystal cell, the liquid crystals are preferably what form nematic liquid crystals, such as Schiff based liquid crystals, azoxy-based liquid crystals, biphenyl-based liquid crystals, phenylcyclohexane-based liquid crystals, ester-based liquid crystals, terphenyl-based liquid crystals, biphenylcyclohexane-based liquid crystals, pyrimidine-based liquid crystals, dioxane-based liquid crystals, bicyclooctane-based liquid crystals or cubane-based liquid crystals. In the case of an STN liquid crystal cell, what are obtained by adding cholesteric liquid crystals such as cholestyl chloride, cholesteryl nonanoate or cholesteryl carbonate, or a chiral agent marketed under the trade name of C-15 or CB-15 (of Merk Co., Ltd.) to the above liquid crystals may be used. Further, ferroelectric liquid crystals such as p-desiloxybenzilidene-p-amino-2-methylbutyl cinnamate may also be used.

The polarizer affixed to the exterior sides of the liquid crystal cell is a polarizer manufactured by sandwiching a polarizing film called "H film" which absorbs iodine while polyvinyl alcohol is stretched and aligned between cellulose acetate protective films, or the H film itself.

The liquid crystal alignment film formed by the method of the present invention has higher surface anchoring force and pretilt angle developing stability than the optical alignment film of the prior art. Therefore, when this is used to construct a liquid crystal display element, it has the effect of preventing the formation of a disclination line and a pretilt domain, thereby making it possible to prevent an alignment failure. As a result, a liquid crystal display element which is free from nonuniform display and has uniform photoelectric properties within the plane and high contrast can be constructed.

EXAMPLES

The following examples are provided for the purpose of further illustrating the present invention but are in no way to be taken as limiting.

Synthesis Example 1

0.04 mol (17.1 g) of 4-(6-(4-chalconyloxy)hexanoxy) styrene, 0.01 mol (3.45 g) of p-cetyloxystyrene, 0.05 mol (24.8 g) of 4-(6-(4-chalconyloxy)hexanoxy)phenylmaleimide and 3.0 g of azobisisobutyronitrile were dissolved in 500 ml of dimethylacetamide and reacted at 80° C. in a nitrogen atmosphere for 10 hours. The obtained viscous reaction mixture was poured into methanol to precipitate a polymer which was then dried to produce 44.5 g of poly(styrene-phenylmaleimide) copolymer (to be referred to as "polymer 1" hereinafter).

Synthesis Example 2

0.1 mol(42.8 g) of 4-(6-(4-chalconyloxy)hexanoxy)styrene, 0.01 mol (1.72 g) of p-trifluoromethylstyrene and 3.0 g of azobisisobutyronitrile were dissolved in 500 ml of dimethylacetamide and reacted at 80° C. in a nitrogen atmosphere for 10 hours. The obtained viscous reaction mixture was poured into methanol to precipitate a polymer which was then dried to produce 37.8 g of a polystyrene copolymer (to be referred to as "polymer 2" hereinafter).

Synthesis Example 3

Polymerization of Polyamic Acid 0.1 mol (22.4 g) of 2,3,5-tricarboxycyclopentylacetic dianhydride, 0.05 mol (21.5 g) of 1-(6-(4-chalconyloxy)hexyloxy)-2,4-diaminobenzene and 0.05 mol (17.4 g) of 1-cetyloxy-2,4-diaminobenzene were dissolved in 300 g of N-methyl-2-pyrrolidone and reacted at 60° C. for 6 hours. Thereafter, the reaction mixture was poured into an excessive amount of methanol to precipitate a reaction product. The precipitate was washed with methanol and dried at 40° C. under reduced pressure for 15 hours to produce 60.7 g of polyamic acid (to be referred to as "polymer 3a" hereinafter).

Imidization Reaction 380 g of N-methyl-2-pyrrolidone, 16 g of pyridine and 20.5 g of acetic anhydride were added to 60.7 g of the obtained polymer 3a to carry out imidization at 120° C. for 4 hours. The reaction mixture was then poured into an excessive amount of methanol to precipitate a reaction product. The precipitate was washed with methanol and dried under reduced pressure for 15 hours to produce 54.4 g of polyimide (to be referred to as "polymer 3b" hereinafter).

Comparative Synthesis Example

Polymerization of Polyamic Acid 0.1 mol (22.4 g) of 2,3,5-tricarboxycyclopentylacetic dianhydride, 0.05 mol (5.4 g) of p-phenylenediamine and 0.05 mol (17.4 g) of 1-cetyloxy-2,4-diaminobenzene were dissolved in 300 g of N-methyl-2-pyrrolidone and reacted at 60° C. for 6 hours. The reaction mixture was then injected into an excessive amount of methanol to precipitate a reaction product. The precipitate was washed with methanol and dried at 40° C. under reduced pressure for 15 hours to produce 45.0 g of polyamic acid (to be referred to as "polymer 3a'" hereinafter).

Imidization Reaction 380 g of N-methyl-2-pyrrolidone, 16 g of pyridine and 20.5 g of acetic anhydride were added to 45 g of the obtained polymer 3a' to carry out imidization at 120° C. for 4 hours. The reaction mixture was then injected into an excessive amount of methanol to precipitate a reaction product. The precipitate was washed with methanol and dried under reduced pressure for 15 hours to produce 40.5 g of polyimide (to be referred to as "polymer 3b'" hereinafter).

Example 1

The polymer 1 obtained in Synthesis Example 1 was dissolved in γ-butyrolactone to prepare a solution having a solid content of 4 wt % which was then filtered with a filter having an opening size of 1 μm to prepare a liquid crystal aligning agent solution. This solution was applied to a glass substrate having an ITO transparent electrode film to a thickness of 0.1 μm with a spinner and dried at 180° C. for 1 hour to form a thin film. The surface of this thin film was exposed to 1.0 J/cm$^2$ of linearly polarized radiation having a main wavelength of 365 nm using an Hg—Xe lamp from the normal direction of the plane of the substrate through the SPF-50C-32 Pyrex (registered trademark) glass polarizer (of Sigma Koki Co., Ltd.) by cutting off light having a wavelength shorter than 320 nm.

An epoxy resin adhesive containing aluminum oxide spheres having a diameter of 17 μm was applied to the liquid crystal alignment film formed sides of a pair of the above exposed substrates by screen printing, the substrates were placed one upon the other in such a manner that the polarization directions of ultraviolet radiations irradiated thereto became parallel to each other and pressure-bonded together, and the adhesive was cured. Thereafter, nematic liquid crystals (MLC-6608 of Merk Co., Ltd.) were injected into a space between the substrates from a filling hole which was then sealed with an epoxy adhesive. Further, the substrates were heated at 120° C. and gradually cooled to room temperature to remove the flow alignment of liquid crystals at the time of injecting the liquid crystals. A polarizer was affixed to both sides of the manufactured cell in such a manner that the polarization directions of the polarizers agreed with the polarization plane of ultraviolet radiation to construct a liquid crystal display element.

In the liquid crystal display element, the liquid crystals were vertically aligned and the aligning properties of the liquid crystals were satisfactory. When a voltage of 12 V was applied to the liquid crystal display element, the alignment of the liquid crystals in a direction parallel to the polarization plane of the ultraviolet radiation was observed.

Example 2

A liquid crystal display element was manufactured in the same manner as in Example 1 except that the polymer 2 obtained in synthesis Example 2 was used. The liquid crystal display element was well aligned. When voltage was applied under the same conditions as in Example 1, alignment in a direction parallel to the polarization plane of the ultraviolet radiation was observed.

Example 3

A liquid crystal display element was manufactured in the same manner as in Example 1 except that the polymer 3b obtained in synthesis Example 3 was used. The liquid crystal display element was well aligned. When voltage was applied under the same conditions as in Example 1, alignment in a direction parallel to the polarization plane of the ultraviolet radiation was observed.

Comparative Example 1

A thin film was formed from the polymer 3b' obtained in Comparative Synthesis Example on a substrate in the same manner as in Example 1 and exposed to linearly polarized ultraviolet radiation to manufacture a liquid crystal display element. Although this liquid crystal display element was vertically aligned as well as in Example 1, when voltage was applied under the same conditions as in Example 1, the alignment of liquid crystals was not observed.

Example 4

(1) 0.04 mol (17.1 g) of 4-(6-(4-chalconyloxy)hexanoxy) styrene, 0.01 mol (3.45 g) of p-cetyloxystyrene, 0.05 mol (24.8 g) of 4-(6-(4-chalconyloxyhexanoxy)phenylmaleimide and 3.0 g of azobisisobutyronitrile were dissolved in 500 ml of dimethylacetamide and reacted at 80° C. in a nitrogen atmosphere for 10 hours. The obtained viscous reaction mixture was injected into methanol to precipitate a polymer which was then dried to produce 44.5 g of maleimide/styrene copolymer.

(2) 2 wt % of bisphenol F epoxy resin (Epicoat 828 of Yuka Shell Epoxy Co., Ltd.) was added to the obtained maleimide/styrene copolymer and the resulting mixture was dissolved in γ-butyrolactone to prepare a solution having a solids content of 4 wt %. This solution was filtered with a filter having an opening size of 1 μm to prepare the liquid crystal aligning agent of the present invention.

(3) The obtained liquid crystal aligning agent was applied to a glass substrate having an ITO electrode to a thickness of 80 nm by spin coating and dried at 130° C. for 2 minutes to form a thin film. Thereafter, the surface of this thin film was exposed to linearly polarized light having a main wavelength of 365 nm using a high-pressure Hg lamp through the SPF-50C-32 Pyrex (registered trademark) glass polarizer (of Sigma Koki KK) at an angle of 45° from the normal direction of the plane of the substrate for 240 seconds by cutting off light having a wavelength shorter than 320 nm under heating at 180° C. to obtain a liquid crystal alignment film. The exposed dose was 5.3 J/cm$^2$.

(4) An epoxy resin adhesive containing aluminum oxide spheres having a diameter of 17 μm was applied to the liquid crystal alignment film formed sides of a pair of substrates having the above liquid crystal alignment film by screen printing, the substrates were placed one upon the other in such a manner that the polarization directions of ultraviolet radiations irradiated thereto became parallel to each other and pressure-bonded together, and the adhesive was cured. Thereafter, nematic liquid crystals (MLC-6608 of Merk Co., Ltd.) were injected into a gap between the substrates from a filling hole which was then sealed with an epoxy-based adhesive. Further, the substrates were annealed at 120° C. and then gradually cooled to room temperature to remove flow alignment at the time of injecting the liquid crystals. A polarizer was affixed to both sides of the manufactured cell in such a manner that the polarization directions of the polarizers agreed with the polarization direction of the ultraviolet radiation to manufacture a liquid crystal display element.

(5) When voltage was applied to the obtained liquid crystal display element, the aligning properties of the liquid crystals were satisfactory, a change in the brightness of the liquid crystal display element was observed in response to ON-OFF of the applied voltage, and its contrast was good. The pretilt angle was 3°.

(6) After the obtained liquid crystal display element was annealed at 70° C., 100° C., 120° C., 150° C. and 170° C. for 60 minutes each, the pretilt angle was measured. As shown in FIG. 1, the pretilt angles were 3°±0.2° which means that pretilt angle developing stability was excellent.

Example 5

(1) 0.1 mol (22.4 g) of 2,3,5-tricarboxycyclopentylacetic dianhydride, 0.05 mol (21.5 g) of 1-(6-(4-chalconyloxy) hexyloxy)-2,4-diaminobenzene and 0.05 mol (17.4 g) of 1-cetyloxy-2,4-diaminobenzene were dissolved in 300 g of N-methyl-2-pyrrolidone and reacted at 60° C. for 6 hours. The reaction mixture was then injected into an excessive amount of methanol to precipitate a reaction product. Thereafter, the reaction product was washed with methanol and dried at 40° C. under reduced pressure for 15 hours to produce 60.7 g of polyamic acid.

380 g of N-methyl-2-pyrrolidone, 16 g of pyridine and 20.5 g of acetic anhydride were added to the obtained polyamic acid to carry out an imidization reaction at 120° C. for 4 hours. The reaction mixture was injected into an excessive amount of methanol to precipitate a reaction product. This reaction product was washed with methanol and dried under reduced pressure for 15 hours to produce 54.4 g of polyimide.

(2) 2 wt % of N,N,N',N'-tetraglycidyl-4,4'-diaminodiphenylmethane was added to the obtained polyimide and the resulting mixture was dissolved in γ-butyrolactone to prepare a solution having a solids content of 4 wt % which was then filtered with a filter having an opening size of 1 μm to prepare the liquid crystal aligning agent of the present invention.

(3) A liquid crystal display element was manufactured in the same manner as in Example 1 except that the obtained liquid crystal aligning agent was used. When voltage was applied to the obtained liquid crystal display element, the aligning properties of the liquid crystals were satisfactory, a change in the brightness of the liquid crystal display element was observed in response to ON-OFF of the applied voltage, and its contrast was good. The pretilt angle was 3°.

(4) After the obtained liquid crystal display element was annealed at 70° C., 100° C., 120° C., 150° C. and 170° C. for 60 minutes each, the pretilt angle was measured. All the pretilt angles were 3°±0.3° which means that pretilt angle developing stability was excellent.

Comparative Example 2

A liquid crystal aligning agent and a liquid crystal display element were obtained in the same manner as in Example 1 except that the maleimide/styrene polymer obtained in Example 1 (1) was used and bisphenol F epoxy resin was not used. The obtained liquid crystal display element was satisfactory in terms of the aligning properties of liquid crystals and contrast but when it was evaluated under the same conditions as in Example 1(6), the pretilt angle varied between 1.5° and 3° as shown in FIG. 1. That is, this liquid crystal display element had low pretilt angle developing stability.

As described above, a liquid crystal alignment film can be formed at a high yield by the method of forming a liquid crystal alignment film from the liquid crystal aligning agent of the present invention because adhesion of dust by static electricity and the circuit destruction of an TFT element which occur at the time of rubbing do not occur in the method. A liquid crystal aligning agent prepared by the method of the present invention has high surface anchoring force and pretilt angle developing stability. Therefore, when it is used to obtain a TN or STN liquid crystal display element, an unpreferred alignment failure hardly occurs and a liquid crystal display element having high display quality can be obtained and can be effectively used in various devices. It can be suitably used in display devices for desk calculating machines, wrist watches, clocks, coefficient display panels, word processors, personal computers and liquid crystal TVs.

What is claimed is:

1. A liquid crystal aligning agent comprising a polymer which comprises at least one recurring unit (A) having an optically crosslinkable structure and at least one recurring unit (B) having at least one group selected from the group consisting of a fluorine-containing organic group, an alkyl group having 10 to 30 carbon atoms, and an alicyclic organic group having 10 to 30 carbon atoms, wherein the optically crosslinkable structure is at least one structure selected from the group consisting of structures represented by the following formulae (I), (II), (III) and (IV):

 (I)

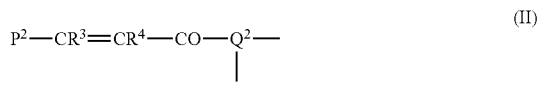 (II)

 (III)

 (IV)

wherein $P^1$ and $P^4$, independently of each other, are a divalent organic group comprising an aromatic ring, $P^2$, $P^3$ and $Q^4$, independently of each other, are a monovalent organic group comprising an aromatic ring, $Q^2$ is a trivalent organic group comprising an aromatic ring selected from the group consisting of benzene, biphenylene, naphthalene and anthracene, $R^1$, $R^2$, $R^3$, $R^4$, $R^5$, $R^6$, $R^7$ and $R^8$, independently of each other, are a hydrogen atom or an alkyl group having 1–6 carbon atoms, and each of $Q^1$ and $Q^3$ independently is selected from the group consisting of a 1,2-phenylene group, a 1,3-phenylene group, a 1,4-phenylene group and a 4,4'-biphenylene group, wherein the amount of (A) recurring units is 10–90%, and the amount of (B) recurring units is 5 to 50% based on the total amount of all recurring units in said polymer.

2. A liquid crystal aligning agent according to claim 1, wherein the polymer further comprises at least one recurring unit (C) having a thermally crosslinkable structure.

3. A liquid crystal aligning agent according to claim 1, further comprising a compound (C') comprising a thermally crosslinkable structure.

4. The liquid crystal aligning agent of claim 2, wherein the thermally crosslinkable structure comprises an epoxy structure.

5. A method of forming a liquid crystal alignment film, comprising exposing a film obtained from the liquid crystal aligning agent of claim 1 to polarized ultraviolet radiation.

6. A method of forming a liquid crystal alignment film, comprising exposing a film obtained from the liquid crystal aligning agent of claim 2 to polarized ultraviolet radiation and heating at room temperature or higher.

7. A liquid crystal display element comprising a liquid crystal alignment film obtained from the liquid crystal aligning agent of claim 1.

8. A liquid crystal display element comprising a liquid crystal alignment film obtained from the liquid crystal aligning agent of claim 2.

9. The liquid crystal aligning agent of claim 1, wherein the polymer comprises at least one main-chain structure selected from the group consisting of polyamic acid, polyimide, polystyrene and maleimide/styrene copolymer.

10. The liquid crystal aligning agent of claim 2, wherein the polymer comprises at least one main-chain structure selected from the group consisting of polyamic acid, polyimide, polystyrene and maleimide/styrene copolymer.

11. The liquid crystal aligning agent of claim 3, wherein the polymer comprises at least one main-chain structure selected from the group consisting of polyamic acid, polyimide, polystyrene and maleimide/styrene copolymer.

12. The liquid crystal aligning agent of claim 3, wherein the compound (C') comprises an epoxy structure.

13. A liquid crystal aligning agent comprising a polymer which comprises at least one recurring unit (A) having an optically crosslinkable structure at least one recurring unit (B) having at least one group selected from the group consisting of a fluorine-containing organic group, an alkyl group having 10 to 30 carbon atoms, and an alicyclic organic group having 10 to 30 carbon atoms, and at least one recurring unit (C) having a thermally crosslinkable structure, wherein the optically crosslinkable structure is at least one structure selected from the group consisting of structures represented by the following formulae (I), (II), (III) and (IV):

 (I)

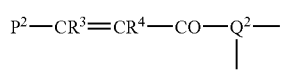 (II)

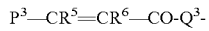 (III)

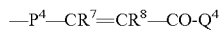 (IV)

wherein $P^1$ and $P^4$, independently of each other, are a divalent organic group comprising an aromatic ring, $P^2$, $P^3$ and $Q^4$, independently of each other, are a divalent organic group comprising an aromatic ring, $Q^2$ is a trivalent organic group comprising an aromatic ring selected from the group consisting of benzene, biphenylene, naphthalene and anthracene, $R^1$, $R^2$, $R^3$, $R^4$, $R^5$, $R^6$, $R^7$ and $R^8$, independently of each other, are a hydrogen atom or an alkyl group having 1–6 carbon atoms, and each of $Q^1$ and $Q^3$ independently is selected from the group consisting of a 1,2-phenylene group, a 1,3-phenylene group, a 1,4-phenylene group and a 4,4'-biphenylene group.

14. A liquid crystal aligning agent comprising a polymer which comprises at least one recurring unit (A) having an optically crosslinkable structure and at least one recurring unit (B) having at least one group selected from the group consisting of a fluorine-containing organic group, an alkyl group having 10 to 30 carbon atoms, and an alicyclic organic group having 10 to 30 carbon atoms, wherein the optically crosslinkable structure is at least one structure selected from the group consisting of structures represented by the following formulae (I), (II), (III) and (IV):

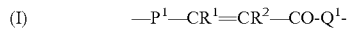 (I)

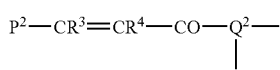 (II)

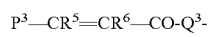 (III)

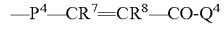 (IV)

wherein $P^1$ and $P^4$, independently of each other, are a divalent organic group comprising an aromatic ring, $P^2$, $P^3$ and $Q^4$, independently of each other, are a monovalent organic group comprising an aromatic ring, $Q^2$ is a trivalent organic group comprising an aromatic ring selected from the group consisting of benzene, biphenylene, naphthalene and anthracene, $R^1$, $R^2$, $R^3$, $R^4$, $R^5$, $R^6$, $R^7$ and $R^8$, independently of each other, are a hydrogen atom or an alkyl group having 1–6 carbon atoms, and each of $Q^1$ and $Q^3$ independently is selected from the group consisting of a 1,2-phenylene group, a 1,3-phenylene group, a 1,4-phenylene group and a 4,4'-biphenylene group, said agent further comprising a compound (C') comprising a thermally crosslinkable structure.

15. The liquid crystal aligning agent of claim 14, wherein the compound (C') comprises an epoxy structure.

16. The liquid crystal aligning agent of claim 13, wherein the thermally crosslinkable structure comprises an epoxy structure.

* * * * *